United States Patent
Meyer et al.

(10) Patent No.: US 8,866,674 B2
(45) Date of Patent: Oct. 21, 2014

(54) CONCEPT OF GENERATING EXPERIENCE MESSAGES FOR UPDATING A REFERENCE DATABASE

(75) Inventors: Steffen Meyer, Erlangen (DE); Juergen Hupp, Nurernberg (DE); Thorsten Vaupel, Homberg (DE); Stephan Haimerl, Seubersdorf (DE); Frank Mueller, Nurernberg (DE); Renata Kitti Zahonyi, Erlangen (DE); Karin Loidl, Senden (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 309 days.

(21) Appl. No.: 13/445,514

(22) Filed: Apr. 12, 2012
(Under 37 CFR 1.47)

(65) Prior Publication Data
US 2013/0342400 A1    Dec. 26, 2013

Related U.S. Application Data

(63) Continuation of application No. PCT/EP2010/065552, filed on Oct. 15, 2010.

(30) Foreign Application Priority Data

Oct. 16, 2009    (DE) .......................... 10 2009 049 672

(51) Int. Cl.
  *G01S 3/02*    (2006.01)
  *G01S 5/02*    (2010.01)
  *H04W 64/00*   (2009.01)

(52) U.S. Cl.
  CPC ............. *H04W 64/00* (2013.01); *G01S 5/0252* (2013.01)
  USPC ....................................................... 342/451

(58) Field of Classification Search
  CPC ......................................................... G01S 3/02
  USPC ....................................................... 342/451
  See application file for complete search history.

(56) References Cited

U.S. PATENT DOCUMENTS

2003/0043073 A1    3/2003 Gray et al.
2005/0206566 A1    9/2005 Stilp et al.
(Continued)

FOREIGN PATENT DOCUMENTS

CN    101208965    6/2008
GB    24 45 986    7/2008
(Continued)

*Primary Examiner* — Harry Liu
(74) *Attorney, Agent, or Firm* — Michael A. Glenn; Perkins Coie LLP

(57) ABSTRACT

At a current position, a measurement packet is determined by a mobile terminal device at a measurement time. The measurement packet includes transmitter identifications of radio transmitters receivable at the current position of the mobile terminal device at the measurement time. By means of reference measurement packets provided to the mobile terminal device, the mobile terminal device itself can determine its current position. Additionally, a deviation of the determined transmitter identifications of the measurement packet from reference transmitter identifications of the reference measurement packets is determined. If a deviation of the reference transmitter identifications from the transmitter identifications determined at the current position is detected, experience messages can be generated that can again result in an update measure as, for example, updating the reference database by adding new transmitter identifications to the reference database and/or removing obsolete reference transmitter identifications from the reference database.

12 Claims, 13 Drawing Sheets

(56) References Cited

U.S. PATENT DOCUMENTS

| | | |
|---|---|---|
| 2006/0095348 A1 | 5/2006 | Jones et al. |
| 2006/0095349 A1 | 5/2006 | Morgan et al. |
| 2006/0106850 A1 | 5/2006 | Morgan et al. |
| 2006/0200843 A1 | 9/2006 | Morgan et al. |
| 2006/0240840 A1 | 10/2006 | Morgan et al. |
| 2007/0001869 A1* | 1/2007 | Hunzinger .................. 340/903 |
| 2007/0004427 A1 | 1/2007 | Morgan et al. |
| 2007/0004428 A1 | 1/2007 | Morgan et al. |
| 2007/0126635 A1 | 6/2007 | Houri |
| 2008/0132170 A1 | 6/2008 | Alizadeh-Shabdiz et al. |
| 2008/0139217 A1 | 6/2008 | Alizadeh-Shabdiz et al. |
| 2008/0176583 A1 | 7/2008 | Brachet et al. |
| 2009/0075672 A1 | 3/2009 | Jones et al. |
| 2009/0149197 A1 | 6/2009 | Morgan et al. |
| 2011/0035420 A1 | 2/2011 | Alizadeh-Shabdiz et al. |
| 2011/0093443 A1 | 4/2011 | Alizadeh-Shabdiz et al. |
| 2011/0317579 A1 | 12/2011 | Jones et al. |
| 2012/0178477 A1 | 7/2012 | Morgan et al. |
| 2012/0309420 A1 | 12/2012 | Morgan et al. |
| 2013/0072227 A1 | 3/2013 | Morgan et al. |
| 2013/0184003 A1 | 7/2013 | Alizadeh-Shabdiz et al. |

FOREIGN PATENT DOCUMENTS

| | | |
|---|---|---|
| WO | WO 98/10307 | 3/1998 |
| WO | WO 2007/081356 | 7/2007 |
| WO | WO 2007/101107 | 9/2007 |
| WO | WO 2008/113439 | 9/2008 |
| WO | WO 2009/043073 | 4/2009 |

* cited by examiner

CONCEPT OF GENERATING EXPERIENCE MESSAGES FOR UPDATING A REFERENCE DATABASE

CROSS-REFERENCE TO RELATED APPLICATIONS

This application is a continuation of copending International Application No. PCT/EP2010/065552, filed Oct. 15, 2010, which is incorporated herein by reference in its entirety, and additionally claims priority from German Patent Application No. 102009049672.6, filed Oct. 16, 2009, which is also incorporated herein by reference in its entirety.

The present invention relates to an apparatus and to a method for generating experience messages for updating a reference database using receive signal conditions stored at reference positions and, in particular, to how wirelessly communicating terminal devices can be localized reliably and at high precision, information on changes of the infrastructure in the form of experience messages from the actual localization being integrated continuously.

BACKGROUND OF THE INVENTION

In a few years time, (self) localization of mobile devices or terminal devices will be among the most important basics for modern user-friendly applications. With a continuously increasing spreading of convenient mobile devices (such as, for example, PDAs, Smartphones) in connection with an extensive availability of digital or analog transmission technologies (such as, for example, WLAN, UMTS, GSM), the market for applications which provide the user with location-relevant information in any situation is growing as well. Today's applications are mainly based on the satellite navigation system NAVSTAR-GPS. However, in intra-urban regions with high buildings, tunnels and bridges, and within buildings (such as, for example, airports, stations, trade fair centers), it is frequently not able to provide a position or only a very imprecise position, since the satellite signals are attenuated or influenced too strongly. It is especially these locations which exhibit a high visitor frequency. What is useful is an alternative, cheap and reliable localization technology taking this scenario into account.

The WLAN standard in accordance with IEEE 802.11 (a,b,g) has become established for the wireless network connection of portable devices. It is under continuous development, with regard to both data rate and range. The established standards, and the 802.11n standard worked on at present, allow broad-band data transmission at high data rates and exhibit a high degree of integration which allows using cheap hardware. Wireless interfaces, such as, for example, WLAN mentioned, are most frequently integrated in current PDAs and Smartphones. Additionally, Bluetooth and, in the future, maybe WIMAX are employed frequently.

In the case of WLAN, commercial public WLAN access points (hot spots) are meanwhile available in many locations of high visitor frequency. In addition, the rapidly increasing spreading of broad-band Internet access (exemplarily using DSL) has supported the spreading of WLAN as a cheap home-networking technology in the private sector as well. Several studies have revealed that intra-urban regions today are covered by WLAN almost exhaustively in many communities, or even over-covered. Particularly locations of everyday life and of interest for tourists are well-equipped in this regard.

At present, it seems to be practical to use WLAN as a basic technology for localization. Other technologies to which the inventive concept discussed below may also be applied will surely be employed one day. Localization in WLAN networks may principally be performed by evaluating the base stations received (hot spot) or access points, wherein exemplarily the respective signal strength received on the terminal device is evaluated. However, WLAN signals are shielded strongly by buildings and other obstacles, wherein in particular in regions of comprehensive WLAN provision, there are typically no ideal free-field conditions since they are located in urban areas. The consequence is that it is not possible to directly deduce the distance to a base station or another communication partner using the signal strength or field strength measured. A public environment or a dynamically changing environment (such as, for example, a warehouse) is principally subject to non-influenceable changes (build up/disassembly/exchange of access points, temporally limited activity of the access points, etc.)

In WLAN-based localization systems, so-called received signal strength (RSS) fingerprinting is frequently used as a basic method. This method is based on the assumption that signal strengths received or receivable at a current location from radio signals of several radio stations unambiguously characterize the current location or the current position. If there is a reference database which contains, for a number of reference locations or reference positions, transmitter identifications of radio stations received or receivable there at reference points in time, and the signal strengths of the corresponding radio signals, the current position can be deduced from a set of current measuring values (transmitter identifications and signal strength values belonging thereto) by matching currently measured measuring values and the reference values of the database. This matching evaluates for every reference point how similar its measuring or reference values recorded before are to the current measuring values of the current position. The most similar reference point(s) is/are then used as a basis for an estimated value for the current whereabouts of the mobile terminal device.

The signal strength of a radio transmitter receivable at a reference position at a reference measuring time is determined experimentally for a reference database by a reference measurement. The result is a database which contains a list of radio transmitters (access points) including the respective associated receive field strength and quality for every reference position where a reference measurement was performed before. This list may also be referred to as reference packet. With a WLAN implementation, such a reference database may exemplarily contain the following parameters:

| RID | MAC | RSSI | PGS | X | Y | Z | MAPNR | CREATED |
|---|---|---|---|---|---|---|---|---|
| 1 | 00.0D.54.9E.17.81 | 46530 | 100 | 5795 | 15627 | 150 | 0 | 12.03.07 12:42 |
| 1 | 00.0D.54.9E.1A.BA | 67260 | 90 | 5795 | 15627 | 150 | 0 | 12.03.07 12:42 |
| 1 | 00.0D.54.9E.1D.64 | 72002 | 88 | 5795 | 15627 | 150 | 0 | 12.03.07 12:42 |
| 1 | 00.0E.6A.D3.B9.8B | 59531 | 100 | 5795 | 15627 | 150 | 0 | 12.03.07 12:42 |
| 1 | 00.0F.A3.10.07.6C | 46464 | 96 | 5795 | 15627 | 150 | 0 | 12.03.07 12:42 |
| 1 | 00.0F.A3.10.07.FB | 74488 | 94 | 5795 | 15627 | 150 | 0 | 12.03.07 12:42 |
| 1 | 00.0F.A3.10.09.SF | 72375 | 97 | 5795 | 15627 | 150 | 0 | 12.03.07 12:42 |

-continued

| RID | MAC | RSSI | PGS | X | Y | Z | MAPNR | CREATED |
|---|---|---|---|---|---|---|---|---|
| 2 | 00.0D.54.9E.17.81 | 54138 | 100 | 14399 | 15451 | 150 | 0 | 12.03.07 12:43 |
| 2 | 00.0D.54.9E.18.1D | 76560 | 11 | 14399 | 15451 | 150 | 0 | 12.03.07 12:43 |
| 2 | 00.0D.54.9E.1A.BA | 62318 | 94 | 14399 | 15451 | 150 | 0 | 12.03.07 12:43 |
| 2 | 00.0D.54.9E.1D.64 | 71348 | 96 | 14399 | 15451 | 150 | 0 | 12.03.07 12:43 |
| 2 | 00.0E.6A.D3.B9.8B | 45393 | 100 | 14399 | 15451 | 150 | 0 | 12.03.07 12:43 |
| 2 | 00.0F.A3.10.07.6C | 66853 | 96 | 14399 | 15451 | 150 | 0 | 12.03.07 12:43 |
| 2 | 00.0F.A3.10.07.FB | 72251 | 100 | 14399 | 15451 | 150 | 0 | 12.03.07 12:43 |
| 2 | 00.0F.A3.10.09.5F | 70990 | 90 | 14399 | 15451 | 150 | 0 | 12.03.07 12:43 |
| 3 | 00.0D.54.9E.17.81 | 58291 | 100 | 24583 | 15627 | 150 | 0 | 12.03.07 12:43 |
| 3 | 00.0D.54.9E.18.1D | 78610 | 68 | 24583 | 15627 | 150 | 0 | 12.03.07 12:43 |
| 3 | 00.0D.54.9E.1A.BA | 62153 | 98 | 24583 | 15627 | 150 | 0 | 12.03.07 12:43 |
| 3 | 00.0D.54.9E.1D.64 | 64187 | 90 | 24583 | 15627 | 150 | 0 | 12.03.07 12:43 |
| 3 | 00.0E.6A.D3.B9.8B | 32851 | 100 | 24583 | 15627 | 150 | 0 | 12.03.07 12:43 |
| 3 | 00.0F.A3.10.07.6C | 69006 | 96 | 24583 | 15627 | 150 | 0 | 12.03.07 12:43 |
| 3 | 00.0F.A3.10.07.FB | 71749 | 92 | 24583 | 15627 | 150 | 0 | 12.03.07 12:43 |
| 3 | 00.0F.A3.10.09.5F | 71482 | 83 | 24583 | 15627 | 150 | 0 | 12.03.07 12:43 |
| 3 | 00.0F.A3.10.09.80 | 71000 | 40 | 24583 | 15627 | 150 | 0 | 12.03.07 12:43 |

The table contains the following information:
reference position identification (RID)
MAC addresses of the stations received
receive field strengths of the radio transmitters (RSSI (Received Signal Strength Indicator); 46560 means −46.560 dBm)
reference position in Cartesian metric coordinates (x, y, z; 24583 means 245.83 m), and
time of taking the measuring value.

The column PGS ("Percentage Seen") indicates how frequently this station was seen on a percentage basis when taking the measuring values (i.e. PGS=90 means that the station was measured on average in 9 out of 10 measurements).

In the table illustrated above, all the information associated with a reference position identification (RID) correspond to a reference measurement packet. This means that the above exemplary table includes three reference measurement packets corresponding to three different geographical reference positions.

When localizing, currently received radio transmitters including their respective associated received field strengths (measurement packet) are compared to reference packets from the reference database in a matching phase. Reference packets of smaller a distance to the current measurement packet, i.e. many common radio transmitters and few differing received field strengths, fit the current measurement packet well. The reference positions belonging to the well-fitting reference packets are very probable and are considered in a position calculating phase. An estimated value for the current position exemplarily results from a reference position associated with a reference packet most similar to the current measurement packet or from an interpolation of several reference positions associated with similar reference packets.

A conventional distance formula frequently used in the matching phase:

$$acc = \sum_{n=1}^{Neq} \Delta RSSI_n \quad (1)$$

assumes that all radio transmitters can be received everywhere. In equation (1), acc stands for the distance between the current measurement packet and the reference packet, and $N_{eq}$ for a number of radio transmitters of which transmitter identifications recorded before at the reference positions are identical to transmitter identifications provided at the current position. Differences of RSSI values of radio transmitters of which transmitter identifications recorded before at the reference position are identical to transmitter identifications provided at the current position, are referred to as $\Delta RSSI_n$ (n=1, ..., $N_{eq}$). However, this conventional mode of operation involves the danger of erroneous position estimation—namely exemplarily when the number of radio transmitters of which transmitter identifications recorded before at the reference position are identical to transmitter identifications provided at the position is small and thus an also small RSSI value deviation is determined, which may result in matching which is erroneously estimated as being good. Due to (short-term) shielding effects, it is, for example, possible for not all the radio transmitters to be receivable everywhere. If a reference packet contains radio transmitters A, B and C, a current measurement packet the radio transmitters D, E, the result for the distance will be an (optimum) value 0. The reference packet seems to fit perfectly, even though not a single radio transmitter between the reference and current measurement packets matches.

A modified matching between values or features (such as, for example, transmitter identifications and signal strength values) of stationary radio transmitters currently provided or measured at a current (geographical) position and reference values or features recorded before at a considered (geographical) reference position can be obtained by a kind of filtering of the currently measured features of the radio signals at the position and the reference values of the radio signals recorded before at the reference position. The radio signals here are divided into a first number $N_{eq}$ of radio transmitters of which transmitter identifications recorded before at the reference position are identical to transmitter identifications provided at the current position, and into a second number $N_{neq}$ of radio transmitters of which transmitter identifications recorded before at the reference position and transmitter identifications provided at the position are different, i.e. the transmitter identifications of which are either provided only at the current position and were not recorded before at the reference position, or the transmitter identifications of which were recorded before only at the reference position and not provided at the current position.

Determining the distance or the measure of correspondence for the position is performed on the basis of the features provided of the radio signals, wherein both features of the first number $N_{eq}$ of radio transmitters and features of the second number $N_{neq}$ of radio transmitters are taken into account when determining the measure of correspondence, and wherein the features of the first numbers $N_{eq}$ of radio transmitters and the features of the second number $N_{neq}$ of radio transmitters enter the measure of correspondence differently. With the first number $N_{eq}$ of radio transmitters, transmitter identifications recorded before at the reference position are identical to transmitter identifications provided at the current position. With the second number $N_{neq}$ of radio transmitters, transmitter identifications are either provided only at the current position and were not recorded before at the reference position, or transmitter identifications were recorded before only at the reference position and are not provided at the current position.

Differences between the electromagnetic features recorded before at the reference positions and the electromagnetic features provided at the current position of the first number $N_{eq}$ of radio transmitters are formed correspondingly. These difference RSSI values $\Delta RSSI_1$ to $\Delta RSSI_{Neq}$ are summed up to form a sum $\Sigma \Delta RSSI_n$ in accordance with equation (1). After summing up, this sum $\Sigma \Delta RSSI_n$ is weighted by a weighting factor EQW, i.e. EQW $\Sigma \Delta RSSI_n$. EQW here defines a weight between 0 and 1, indicating how strongly the distance of the measuring values or the distance of the signal strength values $\Sigma \Delta RSSI_n$ is to be weighted compared to the radio transmitters heard in excess or too little at the current position.

If calculating the measure of correspondence was stopped at this stage, it would be possible for reference positions fitting the current position poorer in reality to be selected as candidates instead of better-fitting ones. An example: assuming $N_{eq}=1$ results for a first reference point when compared to the current position, this means that only one radio transmitter identification between the reference measurement packet and the current measurement packet matches. If the corresponding RSSI values of the corresponding measurement packets are exemplarily randomly apart by 2.5 dB, the result will be $\Sigma \Delta RSSI_1/N_{eq}=2.5$ dB. Further assuming $N_{eq}=3$ results for a second reference point when compared to the current position, this means that three radio transmitter identifications between the reference measurement packet and the current measurement packet match. If the corresponding RSSI values are exemplarily apart from one another by 2 dB, 3 dB and 4 dB, the overall result will be $\Sigma \Delta RSSI_N/N_{eq}=3$ dB. The consequence would be that the second reference point would be rated to be poorer than the first one, which would result in an estimate error. Such estimate errors can be avoided or at least reduced using the following modified matching.

For every station present in the reference values, but not in the current measurement values, a penalty value $M_{nh,m(\ )}$ (m=1, ..., $N_{nh}$) may be defined. It may exemplarily be dependent on how reliably the station correspondingly received too little could be received at the reference position in the past. A high penalty value will result, for example, with a previous good receivability of the station received too little, i.e. high RSSI value. Furthermore, the penalty function $M_{nh,m(\ )}$ (m=1, ..., $N_{nh}$) may be combined with a PGS value of the corresponding radio transmitter received too little. A small PGS value in the reference database may exemplarily also result in only a small value of the corresponding penalty function $M_{nh,m(\ )}$. The $N_{nh}$ penalty values $M_{nh,m(\ )}$ (m=1, ..., $N_{nh}$) for the radio transmitters received too little at the current position are summed up to determine a first sum $\Sigma M_{nh,m}(\ )$ of the $N_{nh}$ penalty values of the radio transmitters received too little.

In addition, a penalty function $M_{htm,r}(\ )$ (r=1, ..., $N_{htm}$) or penalty value may be associated with each radio transmitter received in excess at the current position. Here, too, the function for the penalty value $M_{htm,r}(\ )$ (r=1, ..., $N_{htm}$) may be dependent on the current RSSI measurement value of the radio transmitter, and on models, such as, for example, for the environment, the measurement value quality, the age of the reference data, etc. Additionally, the penalty function $M_{htm,r}(\ )$ (r=1, ..., $N_{htm}$) may be combined with a PGS value of the corresponding radio transmitter received in excess. A small PGS value in the reference database may exemplarily also result in only a small value of the corresponding penalty function $M_{htm,r}(\ )$ (r=1, ..., $N_{htm}$).

The first sum $\Sigma M_{nh,m}(\ )$ of the penalty values of the radio transmitters received too little and the second sum $\Sigma M_{htm,r}(\ )$ of the radio transmitters received in excess are summed up and weighted by a weighting factor (1−EQW), i.e. (1−EQW) ($\Sigma M_{nh,m}(\ )+\Sigma M_{htm,r}(\ )$).

Finally, the weighted sum EQW $\Sigma \Delta RSSI_n$ of the differences between electromagnetic features recorded before at the reference position and the electromagnetic features provided at the position of the first number $N_{eq}$ of radio transmitters and the weighted sum (1−EQW) ($\Sigma M_{nh,m}(\ )+\Sigma M_{htm,r}(\ )$) of the penalty values are summed up and normalized using ($N_{eq}+N_{nh}+N_{htm}$) to obtain the distance value acc between the current position and the considered reference position. The distance value acc exemplarily is calculated according to:

$$acc = \frac{EQW \cdot \sum_{n=1}^{N_{eq}} \Delta RSSI_n(\ ) + (1 - EQW) \cdot \left( \sum_{m=1}^{N_{nh}} M_{nh,m}(\ ) + \sum_{r=1}^{N_{HTM}} M_{htm,r}(\ ) \right)}{(N_{eq} + N_{nh} + N_{htm})}. \quad (2)$$

If the distance value acc is determined according to equation (2), correspondence between the current position and the considered reference position will be the greater, the smaller the distance value acc. This means that correspondence will be the greater, the smaller the sum $\Sigma \Delta RSSI_n$ of the differences and the smaller the sums $\Sigma M_{nh,m}(\ )+\Sigma M_{htm,r}(\ )$ of the penalty values. The distance value acc corresponds to the measure of correspondence.

In an urban environment which is characterized by continuous environmental changes, the following problem results when using such a trained method. The database including reference values or reference data are detected at the beginning and may be updated later on continuously or repeatedly. Otherwise, the significance of the reference data decreases—they "age"—and the quality of localization will deteriorate since the receive conditions and/or environmental conditions (recordable environmental information) change over time.

While the fingerprinting method itself does work, the central problem is updating the reference data. Partly, methods in which all the uses are able to rectify gaps and errors in the database by means of "post-training" were suggested in order to keep the cost for setting up and maintaining the database or reference data limited. What is problematic with this approach is the exchange and trustworthiness of such data collected. In order to keep the system operable, erroneous faulty measurements (such as, for example, when a user indicates a wrong actual position when post-training) and deliberate sabotage trials may be prevented from making the common database unusable in any case. Existing approaches for WLAN localization designed for being used in open environments (such as, for example, Place Lab or Skyhook-Wireless) use triangulation instead of fingerprinting as a basic method, including the disadvantages described before. Consequently, these methods need a database in which associating is done from location information of the base station to the base station identification thereof (exemplarily using the MAC address of the base station or access points). Distances to several base stations are estimated from current measurement values and a position is calculated therefrom. In these systems, a secured, reliable database is also set up.

The problem of trustworthiness of trained information and modeling dynamic changes of the environment have only been solved insufficiently. Place Labs converts and imports existing databases including base stations locations from, for example, hot spot operators or from the war-driving-community. Driving up and down streets with the aim of tracking down WLAN stations and providing same with a location reference is referred to as war-driving. War-drivers here use a WLAN-enabled laptop which is additionally equipped with a GPS receiver. The problem here is that topicality of the data, in particular with regard to private stations, cannot be guaranteed. Precision and trustworthiness of these methods are both doubtful.

Skyhook Wireless tries to solve the problem by the cooperation with so-called "scanners". They are specially selected trusted users who maintain the database by targeted war-driving. This means that keeping the database in a current state entails high cost, quick adaptation is not possible when changing access points. Skyhook Wireless at present offer their customers an annual update of the database. In order for the database nevertheless not to age too quickly, access points which do not belong to public hot spots of big providers (which are thus potentially continuously in operation and stationary at one location) are excluded from the system. However, this results in a considerable decrease in area coverage, since a majority of WLAN base stations installed are already of private, non-public nature (SOHO, industry, etc.) and thus mostly evade control and information provision.

The methods described before which are partly used already can only update the database in great time intervals. Consequently, they do not offer practical handling or a practical concept of handling of stations active only at times.

This problem is of particular relevance for private stations which represent a strongly increasing part of the stations, since such private stations are frequently operated only when needed, due to objections with regard to the danger of breaking in the WLAN network or due to radiation exposure. The solutions implemented so far, in particular, do not allow to perform localization of terminal devices reliably without using external positioning systems in urban regions of interest in which, on the one hand, receive conditions are too difficult for triangulation and, on the other hand, the base stations or communication partners available change frequently.

WO 2008/113439 A1 discloses an apparatus and a method for localizing terminal devices. Environmental information are determined here using a terminal device. Then, the position of the terminal device is determined on the basis of the environmental information. Subsequently, environmental information deviating from reference environmental information associated with the position of the terminal device is ascertained so as to be able to finally take an updating measure when a deviation is found. In order to keep the reference data or reference environmental information used by the mobile terminal device in a current and uncorrupted state, the deviations determined of the environmental information from the reference environmental information have to be evaluated with regard to their relevance and trustworthiness. For this purpose, an evaluating means which is based on two criteria is provided. The observation and/or deviation has to contain a minimum measure of change compared to the current state of the reference data. In addition, the observation should be reproducible. Additionally, further criteria which influence the relevance of the observation may be defined. Examples of a minimum measure of a deviation observed or a change are the number of base stations seen, added or dropped, and the variation of the receive field strength of individual stations. An example of the reproducibility criterion may be that the same observation or the same deviation has to be observed several times by the respective mobile terminal device before it may be used for updating the reference data. Alternatively, a similar observation or a similar deviation may have to be made by several independent sources.

SUMMARY

According to an embodiment, an apparatus for updating a reference database including reference measurement packets associated with geographical reference positions, which include reference transmitter identifications of radio transmitters receivable at the reference position at the reference times, determined at the respective geographical reference positions at reference times, may have: a determiner for determining a current measurement packet at a current geographical position at a current time, wherein the current measurement packet includes transmitter identifications of radio transmitters receivable at the current geographical position at the current time; a selector for selecting an amount of reference measurement packets exceeding a predetermined measure of correspondence to the current measurement packet, wherein the amount of selected reference measurement packets includes a reference measurement packet or a plurality of reference measurement packets; a storer for storing that is implemented to store transmitter identifications received prior to the current time and after a last update of the reference database in an amount of previously received radio transmitters; a determiner for determining a transmitter identification contained in the amount of selected reference measurement packets and not contained in the current measurement packet; and a generator for generating an experience message with respect to the determined transmitter identification, wherein the generator for generating the experience message is adapted to store the determined transmitter identification in an amount of transmitter identifications to be potentially removed, when the determined transmitter identification is not stored in the amount of previously received radio transmitters stored by the storer.

According to another embodiment, a method for updating a reference database including reference measurement packets associated with geographical reference positions, which include reference transmitter identifications of radio transmitters receivable at the reference position at the reference times, determined at the respective geographical reference positions at reference times, may have the steps of: determining a current measurement packet at a current geographical position at a current time, wherein the current measurement packet includes transmitter identifications of radio transmitters receivable at the current geographical position at the current time; selecting an amount of reference measurement packets exceeding a predetermined measure of correspondence to the current measurement packet, wherein the amount of selected reference measurement packets includes a reference measurement packet or a plurality of reference measurement packets; storing transmitter identifications received prior to the current time and after a last update of the reference database in an amount of previously received radio transmitters; determining a transmitter identification contained in the amount of the selected reference measurement packets and not contained in the current measurement packet; and generating an experience message with respect to the determined transmitter identification, wherein the determined transmitter identification is stored in an amount of transmitter identifications to be potentially removed, when the determined transmitter identification is not stored in the amount of previously received radio transmitters.

Another embodiment may have a computer program for performing the method for updating a reference database including reference measurement packets associated with geographical reference positions, which include reference transmitter identifications of radio transmitters receivable at the reference position at the reference times, determined at the respective geographical reference positions at reference times, which method may have the steps of: determining a current measurement packet at a current geographical position at a current time, wherein the current measurement packet includes transmitter identifications of radio transmitters receivable at the current geographical position at the current time; selecting an amount of reference measurement packets exceeding a predetermined measure of correspondence to the current measurement packet, wherein the amount of selected reference measurement packets includes a reference measurement packet or a plurality of reference measurement packets; storing transmitter identifications received prior to the current time and after a last update of the reference database in an amount of previously received radio transmitters; determining a transmitter identification contained in the amount of the selected reference measurement packets and not contained in the current measurement packet; and generating an experience message with respect to the determined transmitter identification, wherein the determined transmitter identification is stored in an amount of transmitter identifications to be potentially removed, when the determined transmitter identification is not stored in the amount of previously received radio transmitters, when the computer program runs on a computer or microcontroller.

Embodiments of the present invention provide computer programs for performing the inventive methods.

Embodiments of the present invention make use of the fact that common fingerprinting-based localization algorithms (exemplarily based on WLAN, Bluetooth, WIMAX, etc.) usually use only three to four base stations for secure localization. Thus, small changes in the infrastructure (such as, for example, station being added or deleted) can be tolerated at little precision losses. After a position calculating phase, both the current position of a mobile terminal device is known, as well as the fact that a change has been observed so that the change in infrastructure or the environmental information is combined with the estimated position and can be processed further. A change proven in this way or a deviation of the environmental information from the reference environmental information determined in this way indicating that the original reference environmental information (reference data) for the estimated positions are obsolete, may be used for integrating the change observed in the reference data.

In accordance with one embodiment, a measurement packet is determined by a mobile terminal device at a current position at a measurement time. The measurement packet here comprises, as has already been described above, transmitter identifications of radio transmitters receivable at the current position of the mobile terminal device at the measurement time. By means of reference measurement packets made available to the mobile terminal device, the mobile terminal device itself is able to determine its current position. Additionally, a deviation of the transmitter identifications determined of the measurement packet from reference transmitter identifications of the reference measurement packets is determined. If a deviation of the reference transmitter identifications from the transmitter identification determined at the current position is ascertained, an experience message will be generated on the basis of which an updating measure may be taken, such as, for example, updating the reference database, by adding new transmitter identifications to the reference database and/or removing obsolete reference transmitter identifications from the reference database. In accordance with embodiments, the measurement packet of the estimated current position is compared to reference packets of reference positions in the environment of the estimated current position.

Two different scenarios may basically be differentiated with experience messages. On the one hand, the mobile terminal device may, at its current position, detect radio transmitters the transmitter identifications of which have not been stored so far in the reference database, at least no with reference measurement packets to be considered due their position. These radio transmitters are, so to speak, received by the mobile terminal device in excess at the current position. Radio transmitters which are received in excess at the current position of the mobile terminal device, i.e. are not contained in the reference database, were newly installed and/switched on since the time of taking the reference data.

In order to update reference data with radio transmitters found out to be new, embodiments of the present invention provide an apparatus for updating a reference database which comprises reference measurement packets associatable with geographical reference positions, which comprise reference transmitter identifications of transmitter identifications receivable at the respective reference position at the reference times, determined at the respective geographical reference positions at reference times. The apparatus for updating comprises a means for determining a current measurement packet at a current geographical position at a current time, wherein the current measurement packet MP(i) comprises transmitter identifications of radio transmitters receivable at the current geographical position and the current time. In addition, the apparatus for updating includes a means for ascertaining whether the current measurement packet MP(i) comprises a transmitter identification not contained in the reference database, at least not in reference measurement packets to be considered due to their position, and a means for generating an experience message with regard to a newly added radio transmitter, for updating the reference database.

In accordance with one embodiment, the means for ascertaining is configured to search every transmitter identification of the current measurement packet without any preselection in every reference packet of the reference database. If at least one transmitter identification of the current measurement packet cannot be found in the reference database, a measure will be taken.

The aim of an evaluating unit for experience messages is associating the at least one transmitter identification found out to be new in accordance with one embodiment with an already existing reference packet in the reference database. The already existing reference packet which is associated with a certain reference position is extended by the transmitter identification found out to be new and by other values associated with the transmitter identification, such as, for example, the receive power. However, it is at first useful to estimate the current position of the mobile terminal device where the new transmitter identification was received and to compare same to the reference position of reference measurement packet. Only in the case of good correspondence of current position and reference position will the reference measurement packet to the reference position be extended by the at least one new radio transmitter identification. If no sufficiently well fitting reference position can be found to the estimated current position, the experience message cannot be processed in the form described before.

A second scenario with a dynamic infrastructure is complete disappearance of certain radio transmitters. If certain radio transmitters are exemplarily switched off or uninstalled after having taken the reference data, it will be of advantage to take this fact into account by a corresponding update of the reference database, since otherwise a penalty value would erroneously be associated with these radio transmitters which can no longer be received, when calculating the measure of correspondence. A penalty value may be associated with stations which are exemplarily present in the reference values, but not in the current measurement values, or vice versa. This may exemplarily be dependent on how reliably the corresponding station received too little or in excess could be received at the reference position in the past. Penalty values cause an error with short-term shielding effects and are of a counterproductive effect here. Measures of updating are primarily useful for counteracting the negative consequences of disappeared radio transmitters (switched off or uninstalled).

In order to take disappeared radio transmitters into account, embodiments of the present invention provide an apparatus for updating a reference database which comprises reference measurement packets associatable with geographical reference positions which comprise reference transmitter identifications determined at the respective geographical reference positions at reference times of radio transmitters receivable at the reference position at the reference times. The apparatus for updating includes a means for determining a current measurement packet at a current geographical position at a current time, the current measurement packet MP(i) comprising a transmitter identification of at least one radio transmitter receivable at the current geographical position at the current time. Additionally, the apparatus includes a means for selecting an amount of reference measurement packets exceeding a predetermined measure of correspondence to the current measurement packet, the amount of reference measurement packets comprising a reference measurement packet or a plurality of reference measurement packets. The apparatus comprises a means for determining a transmitter identification which is contained in the amount of selected reference measurement packets and is not contained in the current measurement packet, and a means for generating a corresponding experience message with regard to the determined transmitter identification. Due to the experience message, the transmitter identification established cannot be removed from the overall amount of reference measurement packets.

Determining disappeared radio transmitters is generally more complicated than determining newly added radio transmitters since in the latter case, with regard to the current position, an amount of suitable reference positions is to be found at first in any case in order to perform corresponding evaluation. A radio transmitter detected at first to have disappeared may very well have to be amended again later caused by an insecurity in the position estimation. In accordance with one embodiment, potentially disappeared radio transmitters are collected in a storage and compared continuously to current measurement packets. If a potentially disappeared radio transmitter appears in a current measurement packet, it will be removed from the amount of potentially disappeared radio transmitters.

In accordance with embodiments, updating measures in the reference database will only be performed if a certain trust criterion is fulfilled. Exemplarily, updating may be performed if a minimum number of different mobile terminal devices suggest the same updating measure. Furthermore, a measure of quality may exemplarily be used as a trust criterion for determining the position of the mobile terminal device. If the measure of quality indicates that position determination has taken place very reliably, i.e. that a currently estimated position fits the actual current position well, the updating suggestion of the mobile terminal device may be complied with.

In one implementation of the inventive concept, the secure localization that is useful of the mobile terminal device can be made more steady using the information generated already on the changed environmental conditions. This means that this method may also operate in a relatively secure manner with already considerably changed environmental conditions.

In one embodiment, the concept is employed in wireless terminal devices which may exemplarily communicate with other communication partners using WLAN, GSM, Bluetooth or WIMAX. Applying the inventive concept to such devices may be of advantage in that secure and highly precise localization is made possible also in environments subject to quick change in the environmental conditions, i.e. the receive conditions for the underlying wireless technology. A wireless terminal device has stored a reference database or at least part thereof which exemplarily corresponds to an environment around the current whereabouts and manipulates or updates the reference database or part thereof based on its own experience messages.

In accordance with another embodiment of the invention, the inventive concept is used in a peer-to-peer mode in which different terminal devices communicate with one another without requiring a central management instance for mutually exchanging experience messages. Here, too, the individual wireless terminal devices have each stored the reference database or at least part thereof which corresponds, for example, to an environment around the current whereabouts. This may imply the advantage that implementation is cheap since a central management instance can be dispensed with. It may also be of advantage for updating of the reference data in the environment to take place extremely quickly, since no further transmission distance to a potentially remotely located central server has to be put up with. This may cause another advantage of reduced occurrence of data when, in the peer-to-peer mode, only those neighboring further terminal devices are informed about deviation for which this information is of relevance, which are thus exemplarily located in a closer geographical environment of the newly added or disappeared radio transmitter.

In accordance with another embodiment, the concept is operated following a client-server system including a central reference database which manages the reference data and, if this is appropriate, updates same based on experience messages transferred by mobile terminal devices. In accordance with one embodiment, the reference database may receive several experience messages from different terminal devices so that reliability of the experience information can be evaluated before updating the reference data. One advantage of an embodiment may thus be increased reliability of the reference data.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
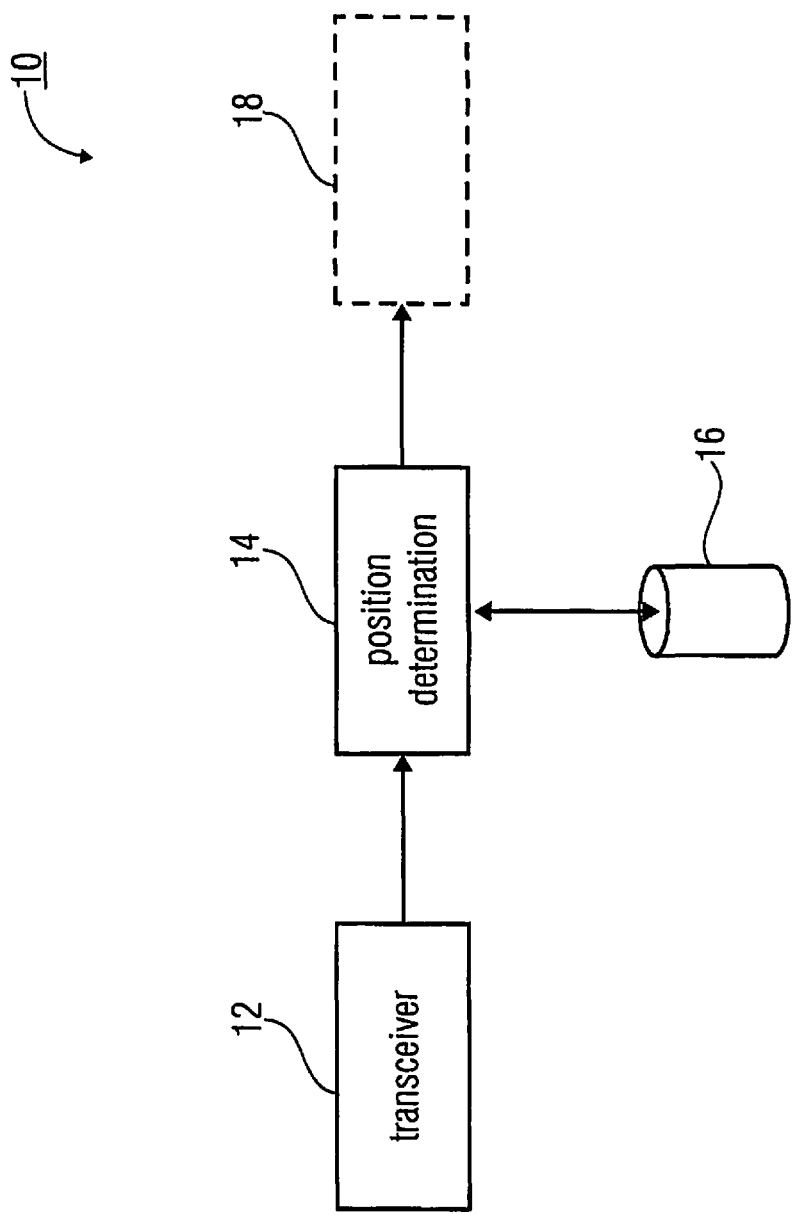
FIG. 1 shows a conventional-technology apparatus for localizing terminal devices.

With regard to the following description, it should be kept in mind that same functional elements or functional elements having the same effect comprise same reference numerals in all the different embodiments and, thus, descriptions of these functional elements are mutually exchangeable in the different embodiments discussed below.

Localization in accordance with the fingerprinting method will be described below briefly making reference to FIGS. 1 and 2 to motivate the inventive concept which will afterwards be explained in greater detail referring to FIGS. 3 to 13.

The fact that the increasing spreading of non-public WLAN radio transmitters has meanwhile resulted in marked over-coverage in many cities is taken into account in particular. Eight to twelve radio transmitters (access points) can frequently be received in a single point, wherein even a number of 30 receivable radio transmitters may be exceeded in intra-urban regions (top values in busy places or areas of high living or population density). Three to four radio transmitters are usually sufficient for secure and precise localization.

FIG. 1 illustrates how the localization of a mobile terminal device can be realized by means of fingerprinting (WLAN, GSM, Bluetooth, WIMAX, etc.) in the public area as self-localization of every individual mobile terminal device. Thereby, no data transmission is required, such that connectivity of the mobile terminal device with other communication partners can basically be omitted. This is possible since the mobile terminal device calculates its own position by continuously (e.g. every 200 milliseconds) measuring current signal characteristics (received measurement packets) of its environment and matching the same to a local reference database (also with reference measurement packets).

For illustrating the concept, FIG. 1 shows exemplarily a schematic illustration of a mobile terminal device 10 capable of self-localization. A receiving means 12 determines measurement packets having a number of radio transmitters within reach and their respective received field strengths. These measurement packets are then transmitted to a position determination unit 14 further having access to reference measurement packets recorded at previous reference times that can be stored in a reference database 16.

Thereby, the reference database 16 can be stored both locally within the mobile terminal device 10 and non-locally on an external memory location or device. In the latter case, the mobile terminal device 10 naturally has to have access to the reference data, for which at least a communication connection to the reference database 16 has to exist. The position determination means 14 uses a localization algorithm in order to determine the current position of the mobile terminal device based on a current measurement packet and the reference measurement packets. Therefore, first, in a matching phase, those reference measurement packets matching best with the current measurement packet, i.e. whose similarity is highest, are determined. Then, in a position calculation phase, based on the determined similar reference measurement packets and their associated geographical reference positions, the current geographical position of the mobile terminal device 10 is estimated. When the current position is estimated, the same can optionally be transmitted to an application module 18, for example for indicating the current position in a digital city map, or to offers services having a direct causal connection with the estimated current position (so called location based services).

In a standard case, the mobile terminal devices 10 each have an extract of the database 16 managed alone by one central server (mobile terminal devices would normally not change their own reference data). In contrast to the mobile terminal devices 10, the server keeps the latest update of the database 16. The mobile terminal devices fetch, for example in certain intervals, a completely new and hence current update from the server, e.g. in exchange for messages of made experiences. Data updates are preformed only by the based on experience messages or new calibration campaigns.

Figure 2:
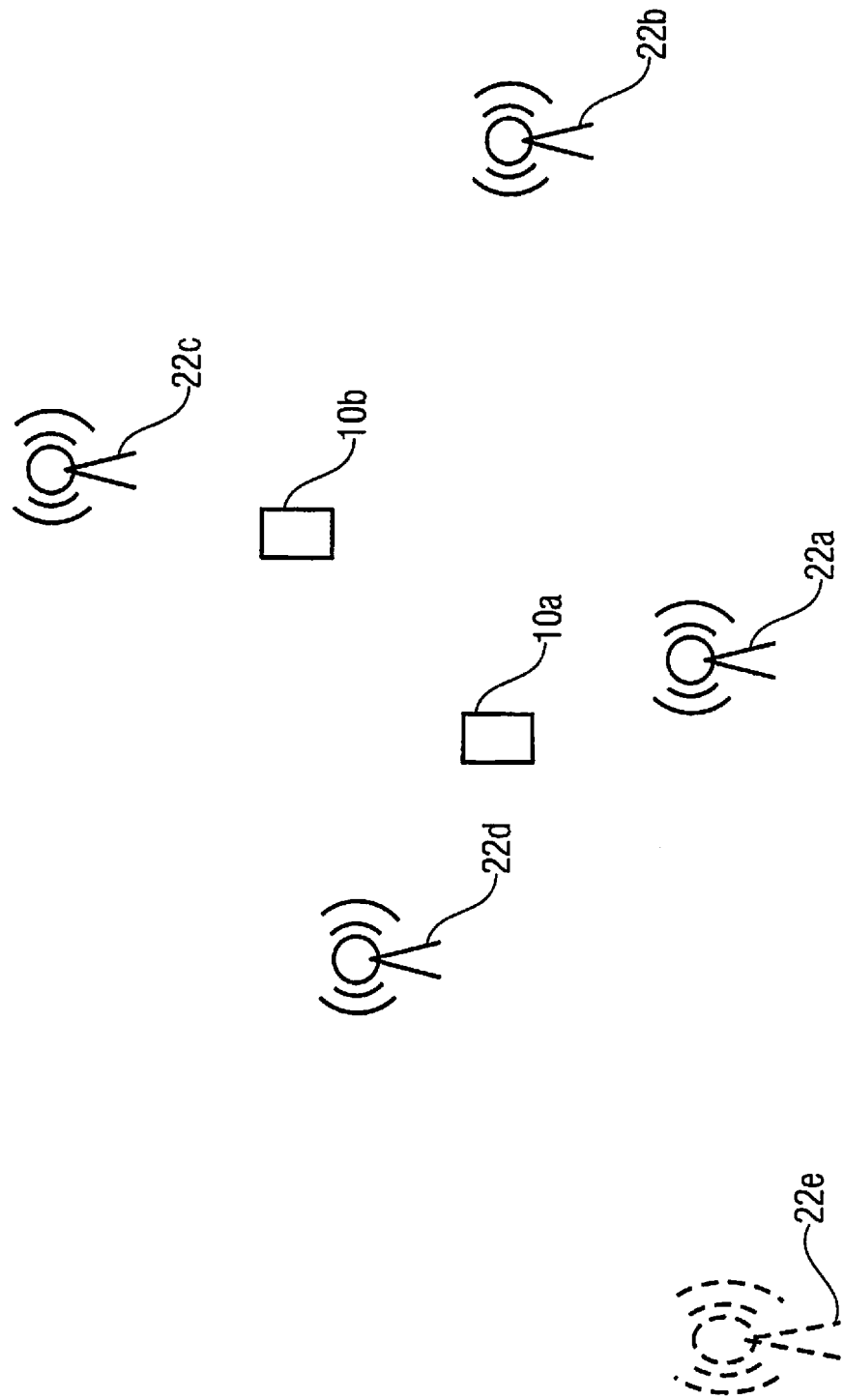
FIG. 2 shows an example of applying the method for localizing terminal devices.

FIG. 2 shows exemplarily an application scenario with two mobile terminal devices 10a and 10b and a plurality of communication partners or radio transmitters 22a to 22e that are in an environment of the mobile terminal devices 10a and 10b. As environmental information, the mobile terminal devices 10a and 10b can determine, for example, the unique identification numbers of the radio transmitters and the received field strength associated with the respective radio transmitters. The radio transmitter 22e is further away from the mobile terminal devices 10a and 10b, such that the same can be received by the mobile terminal devices 10a and 10b at certain times and at other times not, which can also be caused by switching off the base station 22e. In an urban environment, shading by pedestrians or cars can also take place.

Additionally, a change of air quality, in particular air humidity, can have the effect that the radio transmitter $22e$ is received on some days and on others not.

Thus, the mobile terminal devices $10a$ and $10b$ will generally receive time-varying environmental information, even when they do not move themselves. Update measures at the database may not be taken based on short-term occurrences. It is important to differentiate these short-term occurrences from the actual changes of the infrastructure, such as de-installation or new installation of radio transmitters.

If the reference data in the fields of application described in FIGS. 1 and 2 are not continuously updated, this can have a relatively strong adverse effect on the localization accuracy of the mobile terminal devices.

In a first case, it can happen that new radio transmitters have been set up or installed since collecting the reference data at certain locations.

However, new radio transmitters cause no penalty in position calculations since the same can already be filtered out in advance. New radio transmitters are not to be mixed up with detected radio transmitters that are heard in excess, during matching with any reference measurement packet, which would again result in a penalty.

In order to use the same for localization purposes in the future and hence to compensate a disappearance of radio transmitters, it is useful to integrate new base stations detected by users into the reference database 16. This can either take place locally on the mobile terminal device 10 itself or centrally in a central reference database.

New radio transmitters mainly cause experience messages locally in a mobile terminal device, which can then be inserted into the reference database at a central position, if sufficient information exists with respect to a whole area around the assumed position of the new radio transmitter. The danger here is that at locations where reference measurement packets have not yet been updated but the new radio transmitter would still be measurable, wrong penalty values would be appointed for radio transmitters heard in excess.

Figure 3:
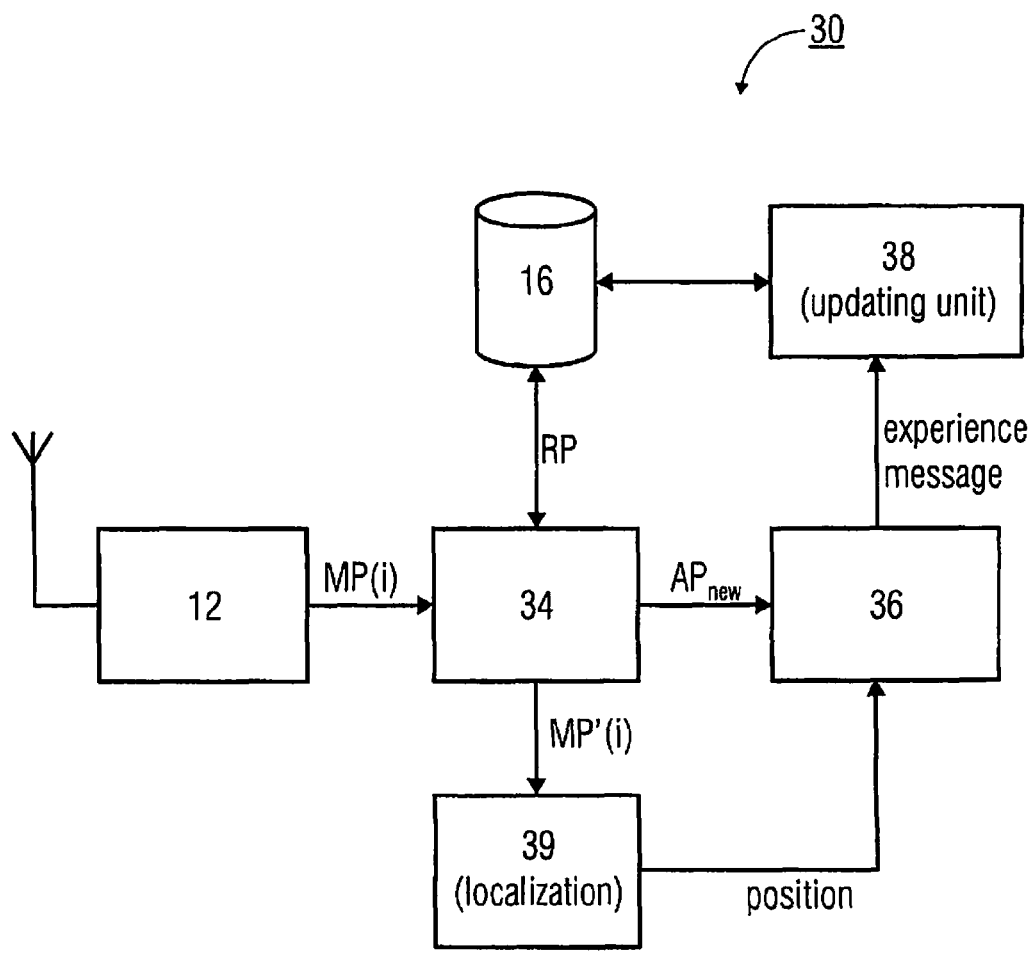
FIG. 3 shows a schematic illustration of an apparatus for updating a reference database by evaluating experience messages with regard to changed environmental conditions in accordance with an embodiment of the present invention.

A schematic illustration of an apparatus 30 for updating a reference database regarding newly added radio transmitters is shown schematically in FIG. 3.

The apparatus 30 serves for updating the reference database 16 comprising reference measurement packets associated with geographical reference positions, which comprise reference transmitter identifications of radio transmitters receivable at the reference position at reference times, determined at the respective geographical reference positions at reference times. The apparatus 30 comprises a means 12 for determining a current measurement packet of MP(i) at a current geographical position at a current time i, wherein the current measurement packet MP(i) comprises transmitter identifications $AP_k$ (k=1, 2, . . . , K) of K radio transmitters receivable at the current geographical position at the current time i. The means 12 is coupled to a means 34 for ascertaining whether the current measurement packet MP(i) has a transmitter identification $AP_{new}$ that is not contained in the reference database 16. Therefore, the means 34 for ascertaining obviously has access to the reference database 16, either via a wired connection or a radio connection between the means 34 and the reference database 16. A means 36 serves for generating an experience message with respect to the transmitter identification $AP_{new}$ consisting of at least the radio transmitter identification $AP_{new}$, a time stamp and the current position obtained by the standard WLAN localization. The means 36 is coupled to a means 38 for updating the reference database 16. Update measures are performed in dependence on the existing experience messages with respect to new radio transmitters. If not sufficient information exists for a respective extension of the reference measurement packets by new radio transmitters, at least a request for a new calibration campaign could be made at the appropriate position.

Figure 4:
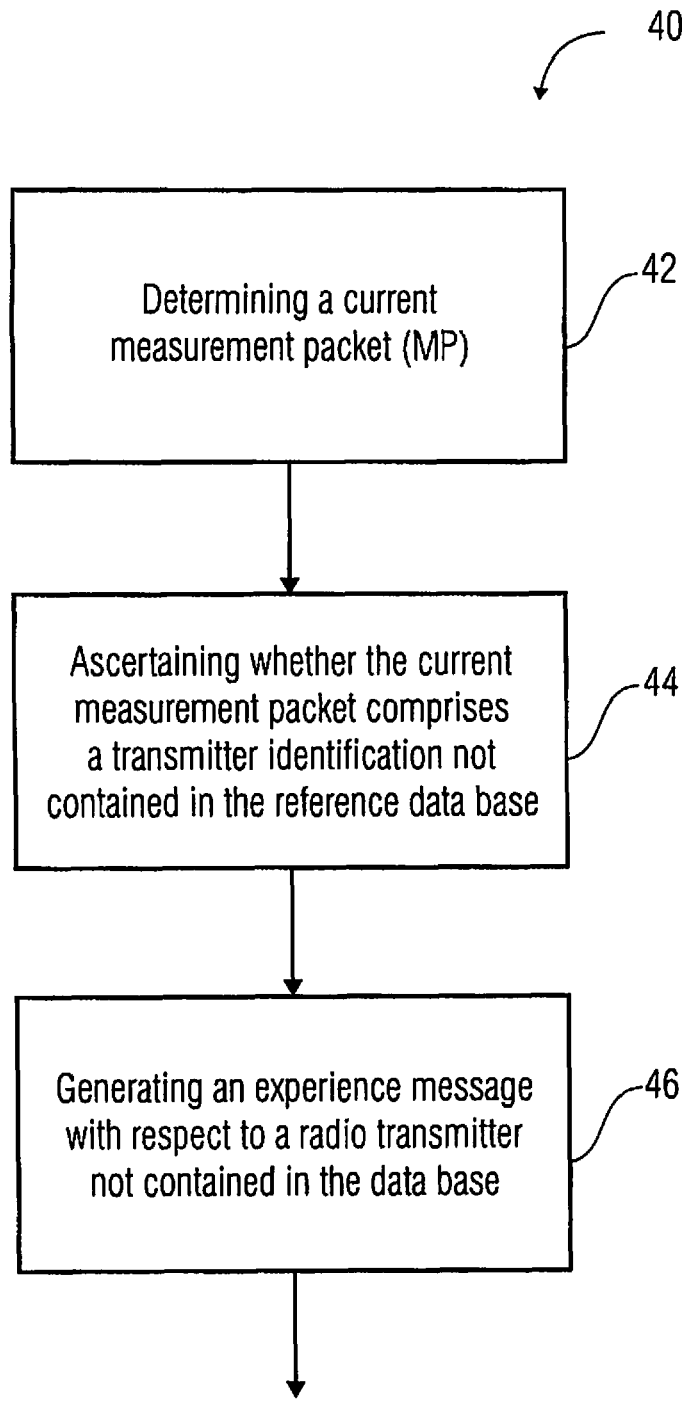
FIG. 4 shows a flow chart of a method for generating corresponding experience messages in accordance with an embodiment of the present invention.
Figure 5:
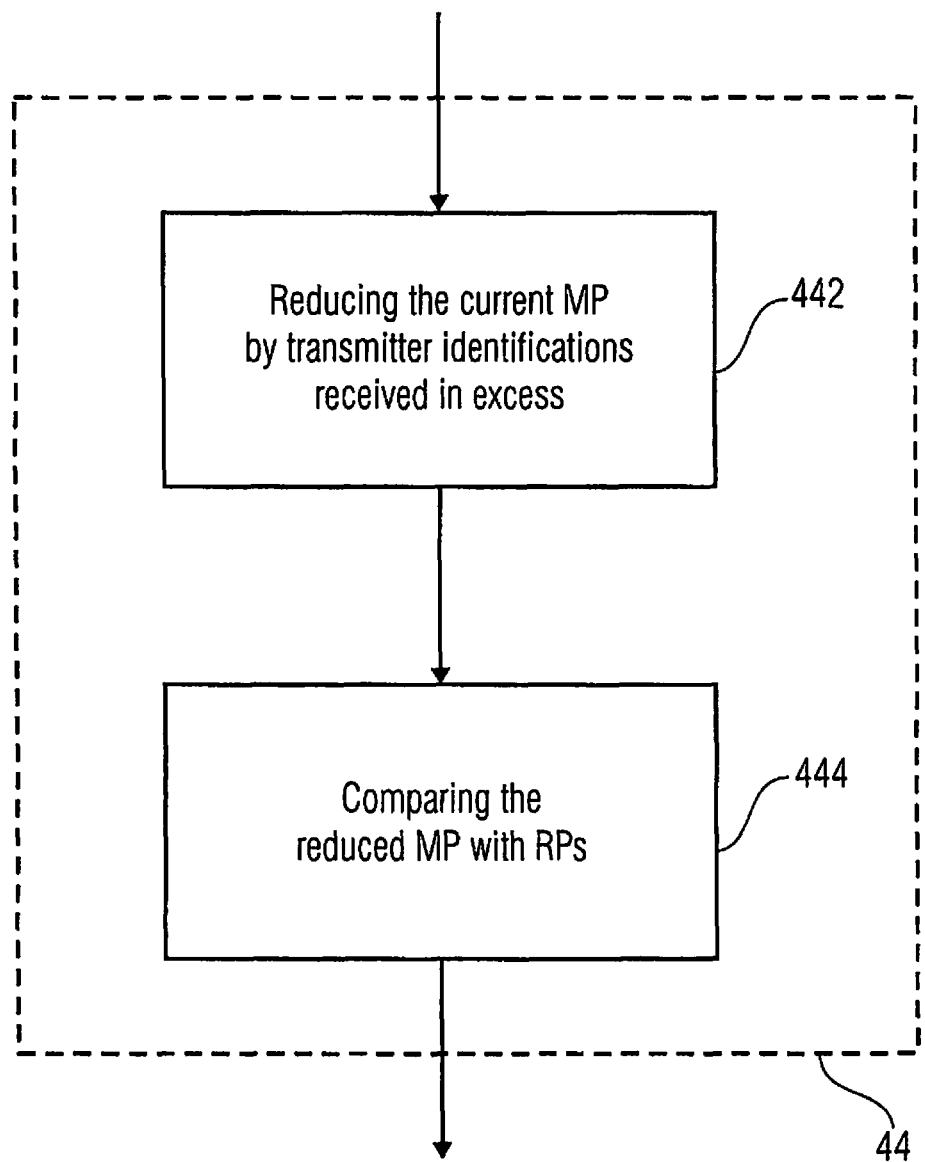
FIG. 5 shows a detailed flow chart of a step of the method in accordance with FIG. 4.
Figure 6:
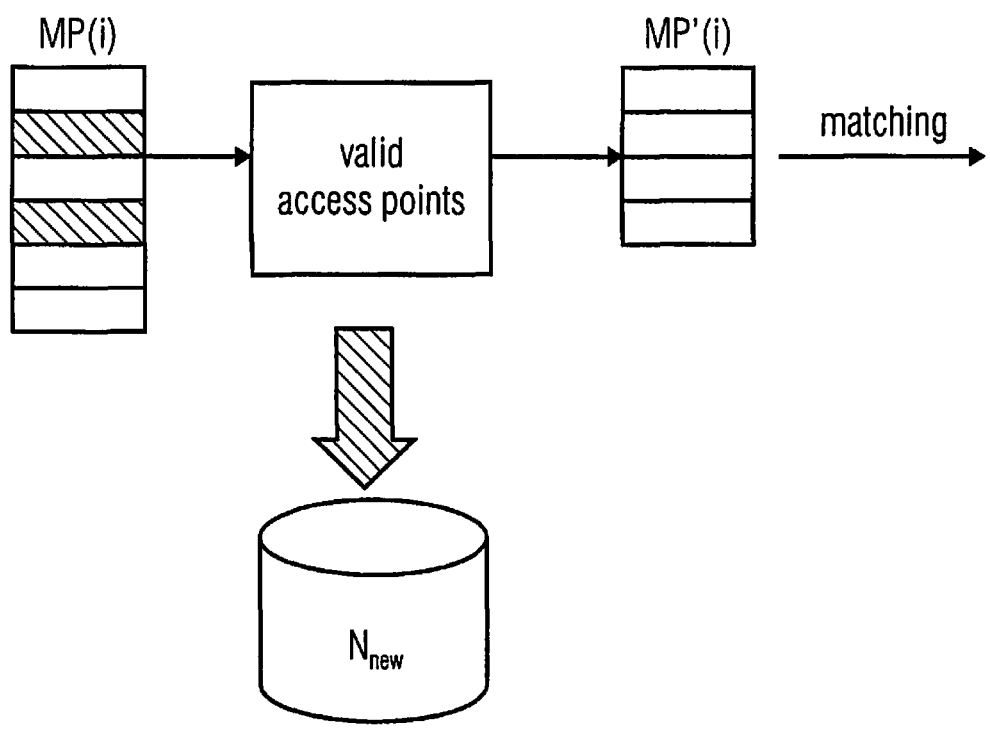
FIG. 6 shows a schematic illustration of adding a radio transmitter found out to be new to the amount of all the radio transmitters, and reducing the measurement packet by new radio transmitters for further processing.

The apparatus 30 shown in FIG. 3 serves for performing the inventive method illustrated schematically in FIG. 4, for generating respective experience messages for updating the reference database 16 with respect to newly added radio transmitters, which will be described in more detail based on FIGS. 4 and 5 below.

In a first step 42, the current measurement packet MP(i) is determined at the current position of the mobile terminal device 10 by means of the transceiver 12. In a subsequent step 44, it is determined whether the current measurement packet MP(i) determined in step 42 has a transmitter identification $AP_{new}$ not contained in the reference database 16. Finally, in a step 46, a respective experience message for updating the reference database is generated.

When ascertaining 44 whether the current measurement packet MP(i) has a transmitter identification $AP_{new}$ not contained in the reference database 16, according to one embodiment, the transmitter identifications $AP_k$ (k=1, 2, . . . , K) occurring in the current measurement packet MP(i) can be compared with all reference transmitter identifications existing in the reference database 16, independent of the current position of the mobile terminal device. However, in reference databases 16 comprising a considerable geographical area or comprising a high number of reference measurement packets, this procedure is to expensive, such that in those cases a preselection of reference measurement packets can be made, whose reference transmitter identifications are compared with the transmitter identifications $AP_k$ (k=1, 2, . . . , K) of the current measurement packet MP(i). This preselection can, for example, be based on an estimated value for the current position or a position estimation value immediately preceding the current time i. Thus, according to other embodiments, only those reference packets are used for comparison whose reference positions are within an environment around the current or previous position of the mobile terminal device 10 whose size can be justified with respect to computing expenditure. For obtaining the location information, the already detected new radio transmitters are filtered out, since the same would interfere with the localization algorithm. After this step, both the position is known and the fact that a change has been noticed, so that the change of the infrastructure or environmental information can be linked with the estimated position and be further processed.

A newly added radio transmitter does not influence the localization in the least, since the same has already been filtered out for actual position determination. This takes place by matching with all radio transmitter identifications contained in the reference points.

This process will be summarized again below based on FIG. 5.

When ascertaining 44 whether the current measurement packet MP(i) comprises a transmitter identification not contained in the reference database 16, the current measurement packet MP(i) is first reduced by transmitter identifications received in excess compared to the reference measurement packets in question with regard to position in a step 442. The considered reference measurement packets advantageously correspond to reference positions that are within the vicinity of the mobile terminal device 10, which can be determined by a conventional position calculation phase. Additionally, the vicinity of the mobile terminal device 10 can lie, for example in a predetermined radius around the last determined position of the mobile terminal device 10.

In a step 444, the reduced current measurement packet MP'(1) is compared to the reference measurement packets of the vicinity, i.e. the measurement packets are compared merely based on those transmitter identifications and the respective RSSI values that appear both in the current measurement packet and in the reference measurement packets. By this comparison that reference packet can be determined having a highest correspondence or similarity with the reduced measurement packet, which means where the differences between the respective RSSI values of the transmitter identification are lowest. This can, for example, be ascertained with the above described equation (1), i.e. the similarity depends on a number $N_{eq}$ of corresponding transmitter identifications between the current measurement packet MP(i) and a reference packet and differences (e.g. ΔRSSI) between quantities in relation with a received field strength that are associated with the corresponding transmitter identifications. The similarity is the higher the more transmitter identifications correspond and the smaller the differences are. Further, penalty values are appointed for the radio transmitters contained in excess and too little in the measurement packet.

According to embodiments of the present invention, together with the transmitter identification $AP_{new}$ considered to be new, associated additional information can be stored as experience messages in order to allow appropriate further processing. This additional information can, for example, be a time stamp indicating when the experience message was made or when the reference database 16 has been updated. Further, the additional information can be a RSSI value, a PGS value, a measure of quality for the current estimated position or the current estimated position itself. A measure of quality of the current estimated position can be derived, for example, from the determined measures of correspondence acc between the current measurement packet and the most similar reference packets. The better the correspondence between current measurement packet and reference measurement packets, the more reliable the estimation of the current position.

FIG. 6 shows again the proceedings when checking the current measurement packet MP(i) for validity of the radio transmitters listed therein.

The current measurement packet MP(i) is compared with at least part of the reference database 16, which comprises radio transmitter identifications that have been valid so far. By this comparison, radio transmitters occurring in the measurement packet MP(i) but not in the part of the reference database 16, can be considered to be new. The radio transmitters considered to be new and their associated RSSI values are first removed from the current measurement packet MP(i) for a subsequent matching and position determination phase, which results in a reduced measurement packet MP'(i). This reduced measurement packet MP'(i) can then be compared with appropriate reference packets in order to determine similar reference packets and thus the current position of the mobile terminal device 10.

A dynamic infrastructure of base stations or radio transmitters in a wireless communication system is characterized in that not only new radio transmitters can be added, but that radio transmitters also disappear since they are, for example, (temporarily) switched off or completely de-installed. A further important aspect of the present invention is to trace also such radio transmitters that have disappeared from the system and to update the reference database 16 accordingly by removing those disappeared radio transmitters from the reference database 16 or at least to not consider them any further.

In contrast to newly added radio transmitters, the disappearance of registered radio transmitters influences the localization quality directly.

Figure 7:
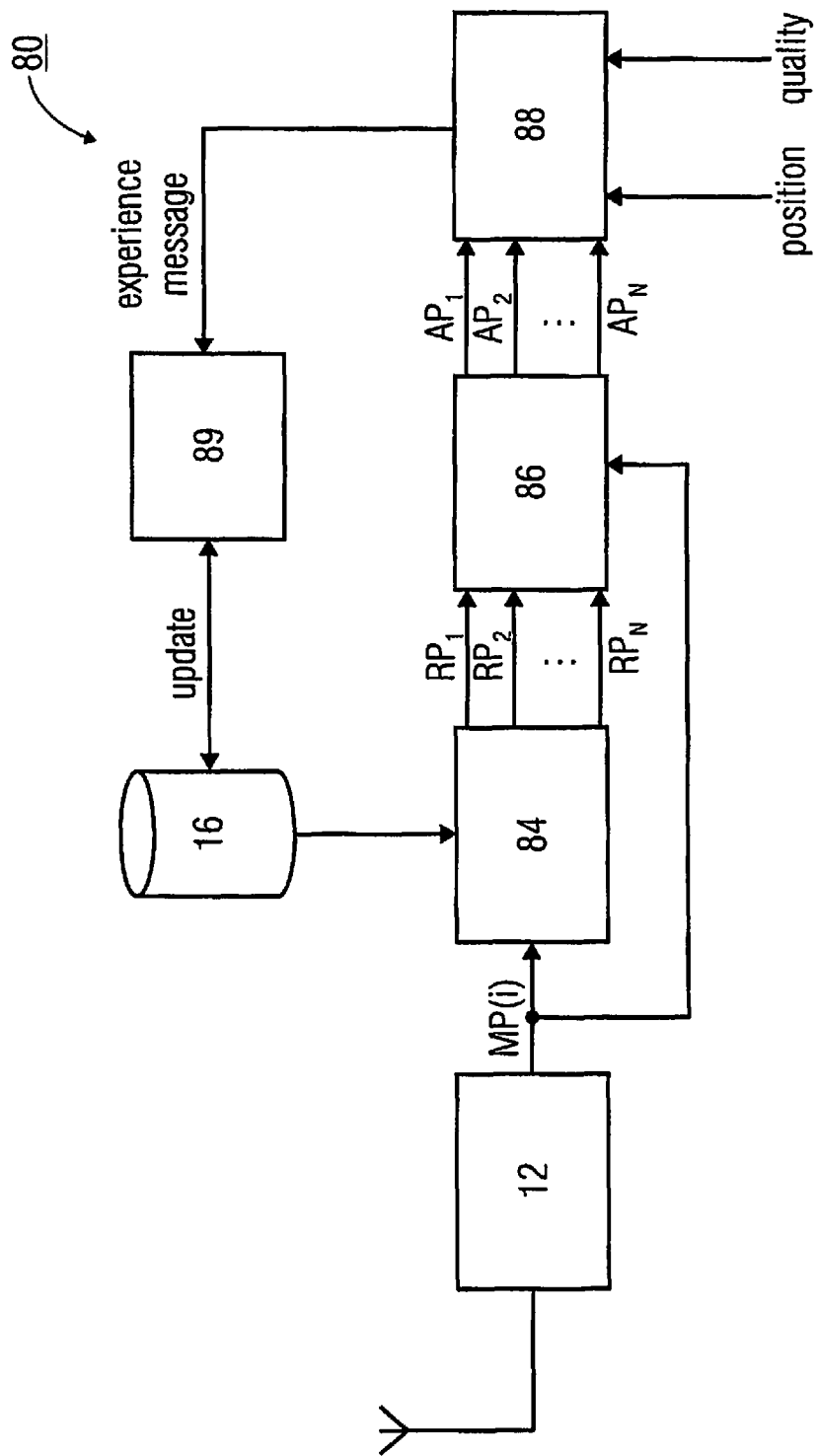
FIG. 7 shows a schematic illustration of an apparatus for updating a reference database by evaluating experience messages with regard to changed environmental conditions in accordance with another embodiment of the present invention.
Figure 8:
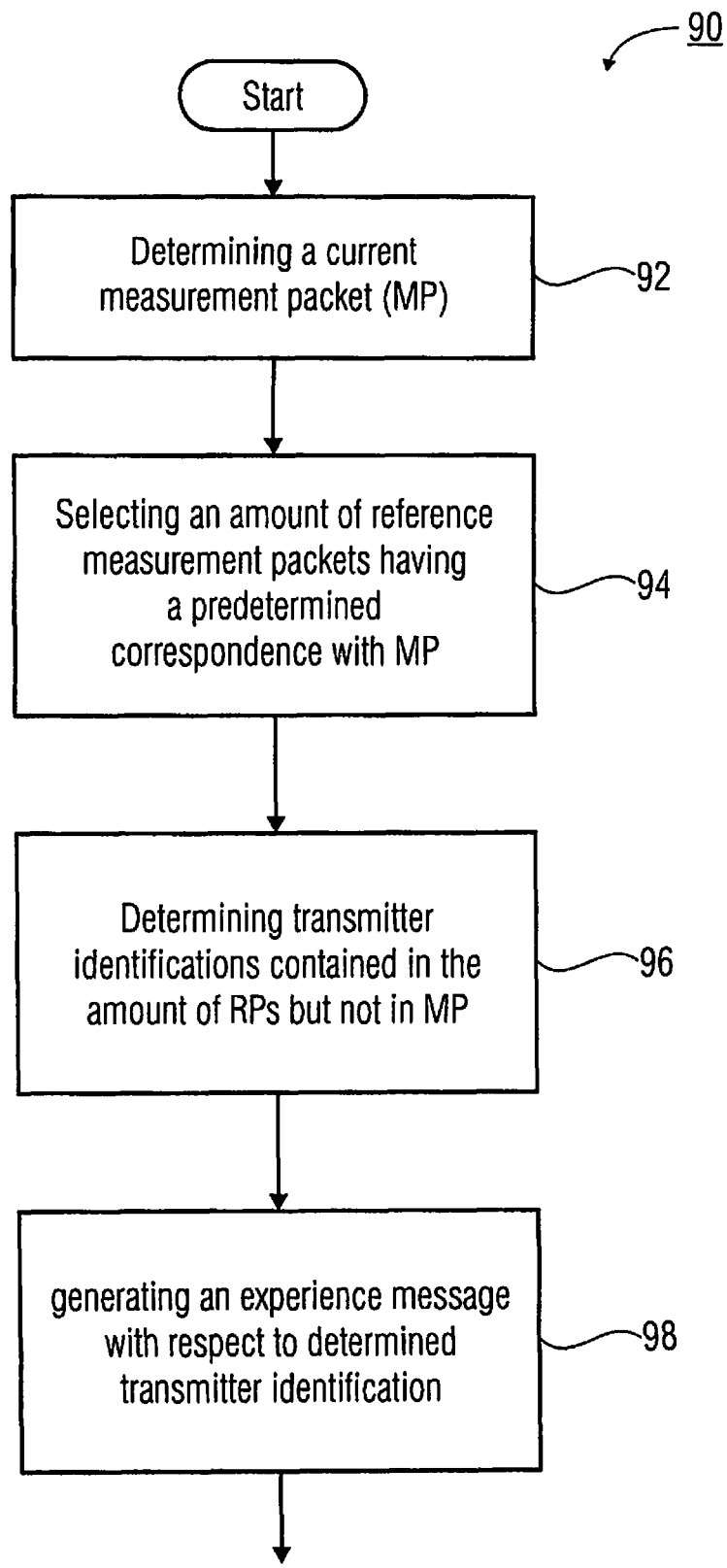
FIG. 8 shows a flow chart of a method for updating the reference database by evaluating experience messages in accordance with an embodiment of the present invention.

In this respect, FIG. 7 shows an inventive apparatus 80 for generating experience messages with respect to disappeared radio transmitters for updating a reference database.

The apparatus 80 comprises a transceiver or a means 12 for determining a current measurement packet MP(i) at a current geographical position at a current measurement time i. The currently determined measurement packet MP(i) is passed on to a means 84 for selecting an amount of reference measurement packets RP exceeding a predetermined measure of correspondence at the current measurement packet MP(i). Therefore, the means 84 for selecting is coupled to the reference database 16. The amount of selected reference measurement packets $RP_n$ (n=1, 2, . . . , N) and the currently determined measurement packet MP(i) are passed on to a means 86 for determining at least one transmitter identification $AP_{old}$ contained in the amount of selected reference measurement packets but not in the current measurement packet.

Further, the apparatus 80 comprises a means 88 for generating an experience message with respect to the determined transmitter identification ($AP_{old}$). Only when radio transmitters are reliably detected as disappeared by one or several mobile terminal devices, the same are removed from all respective reference measurement packets of the complete database 16 by means of an updating unit 89. The updating unit 89 can operate on a mobile terminal device or on a central server. In any of the two cases it is possible to process experience messages from several clients. In this context, the time of the update is important, i.e. the actual change of the reference data since information can get lost during this process.

Reliably determining the disappeared radio transmitters is more complex than the search for new radio transmitters, since first an amount of appropriate reference positions or reference packets has to be found for performing a respective evaluation. Further, it has to be considered that due to an existing uncertainty in position determination, a radio transmitter detected as disappeared previously might have to be revised at a later time. The inventive method that can be performed by the apparatus 80 will be roughly illustrated below with respect to FIG. 8 before the same will be described in more detail based on FIGS. 9, 10 and 11.

First, a mobile terminal device 10 determines a current measurement packet MP(i) at its current position. This is performed, for example, every 200 ms by scanning frequencies in 9a certain frequency band in order to be able to receive radio transmitters transmitting in this frequency band close to the current position. In the same way, determining 92 can also be initiated by an active request of the mobile terminal device 10 in a type of ping-pong protocol, wherein the mobile terminal device 10 requests and a radio transmitter in the vicinity answers. In this manner, normally several (e.g. K) radio transmitters in the vicinity of the mobile terminal device 10 can be received with respectively associated signal strengths. The transmitter identifications $AP_k$ (k=1, 2, . . . , K) and the receive signal values $RSSI_k$ (k=1, 2, . . . , K) of these radio transmitters constitute the current measurement packet MP(i).

In a subsequent step 94 that can be within a position calculation phase or after the same, an amount of reference measurement packets is selected having a predetermined correspondence with the current measurement packet MP(i), i.e. whose distance acc is smaller than an upper limit acc*. This means step 94 represents a matching phase where a correspondence between reference packets stored in the reference database 16 and the current packet is determined. Hence, this is actually first a determination of reference measurement packets having a positional relevance, whose associated reference positions are normally in a vicinity of the estimated current position of the mobile terminal device 10.

In a subsequent step 96, the transmitter identifications $AP_k$ (k=1, 2, ..., K) existing in the current measurement packet MP(i) are compared to the transmitter identifications existing in the similar reference measurement packets. If transmitter identifications occur in the similar reference packets that are not contained in the currently determined measurement packet MP(i), this is an indication that the respective radio transmitters are currently switched off or even completely de-installed and a respective experience message can be output (step 98), that can be used by the mobile terminal device 10 itself, a central server or another mobile terminal device for updating a database.

According to an embodiment of the present invention, these determined transmitter identifications $AP_{old}$ that have been received to little in the current measurement packet MP(i) can be marked as potentially disappeared transmitter identifications or radio transmitters.

The further processing will be described below based on FIGS. 9, 10 and 11.

After a current measurement packet MP(i) has been determined at the current position of the mobile terminal device 10, the same is supplied to the means 84 for selecting together with reference packets from the reference data base 16, in order to obtain, by the matching taking place there, an evaluated amount 102 of reference packets, from which those matching best with the current measurement packet MP(i) are to be selected. Here, in the simplest case, for determining the (potentially) disappeared radio transmitters, only that reference packet matching best with the current measurement packet with regard to position and having the best or lowest acc value can be selected.

By a second matching phase in means 86, to which the selected amount 102 of reference packets and the current measurement packet MP(i) itself is supplied, radio transmitters 104 can be detected, which are contained in the selected amount 102 of reference packets but not in the current measurement packet MP. This amount of radio transmitters 104 selected by block 86 is compared to an amount 106 of radio transmitters that have already been received within a predefined time interval prior to the current measurement time i. Therefore, the apparatus 80 comprises a means for storing where transmitter identifications determined prior to the current time i and after a last update of the reference database 16, i.e. the amount 106, are stored. If radio transmitters of the amount 104 will not be contained in the amount 106, these are associated with an amount 108 of potentially disappeared radio transmitters. Therefore, the means 88 for generating an experience message with respect to a disappeared radio transmitter is adapted to receive a determined transmitter identification $AP_{old}$ in the amount 108 of potentially disappeared transmitter identifications when the determined transmitter identification $AP_{old}$ is not stored in the amount 106 of previously received radio transmitters. According to embodiments, in addition to the potentially disappeared radio transmitters 108, additional information, such as time stamp, RSSI value, PGS value, measure of quality of the current position or the position itself can also be stored. Additionally, the currently measured measurement packet M(i) serves for updating the amount 106 of the already received radio transmitters and the amount 108 of potentially disappeared radio transmitters. Those radio transmitters that are listed in the current measurement packet MP(i), but not in the amount 106 of already received radio transmitters are accommodated in this amount 106 of already received radio transmitters. This means with increasing measurement, localization or navigation duration of the mobile terminal device, this amount 106 continuously increases.

If a radio transmitter that has previously been considered to be potentially disappeared at a reference position of a reference packet appears in a currently measured measurement packet MP(i), the same is removed again from the amount 108 of potentially disappeared radio transmitters and shifted to the amount 106 of already received radio transmitters. The amount 106 is refreshed at a certain interval such that the amount does not become too big and that a possible updating need is not blocked. The length of the predetermined measurement period depends on the desired updating interval. The same can comprise hours but also days.

If an experience message with respect to a disappeared radio transmitter is to be generated by a mobile terminal device 10, a possible subsequent updating measure in the database results in deleting or removing the respective entries of the radio transmitter in all reference measurement packets of the database. Thus, the means 88 for generating the experience message is adapted to generate experience messages for radio transmitters of the amount 108 of transmitter identifications potentially to be removed and to transmit only to the updating unit 89 when a measure of probability is exceeded that indicates how high a probability is to be estimated that the radio transmitters in the amount 108 of transmitter identifications to be removed are really no longer present in an environment of the current geographical position.

In other words, there exists an updating unit 89 for updating a database 16, wherein the means 88 for generating the experience message is implemented to generate experience messages for radio transmitters of the amount 108 of transmitter identifications to be potentially removed and to transmit them to the updating unit 89 when a measure of probability is exceeded that indicates how high a probability is to be estimated that a radio transmitter in the amount 108 of transmitter identifications to be removed is actually no longer present in an environment of the current geographical position. The probability can be calculated depending on a time period, in which an element is in the message or depending on other available information.

Radio transmitters, in particular private WLAN radio transmitters might only be activated at certain times of the day. For example, a private WLAN radio transmitter is rather switched on at night than during the day when its owner is, for example, at work. In order to be able to determine such effects depending on the time of day, according to one embodiment, the amount 106 of already received radio transmitters is refreshed at certain time intervals. However, this does not apply to the amount 108 of potentially disappeared radio transmitters.

Figure 9:
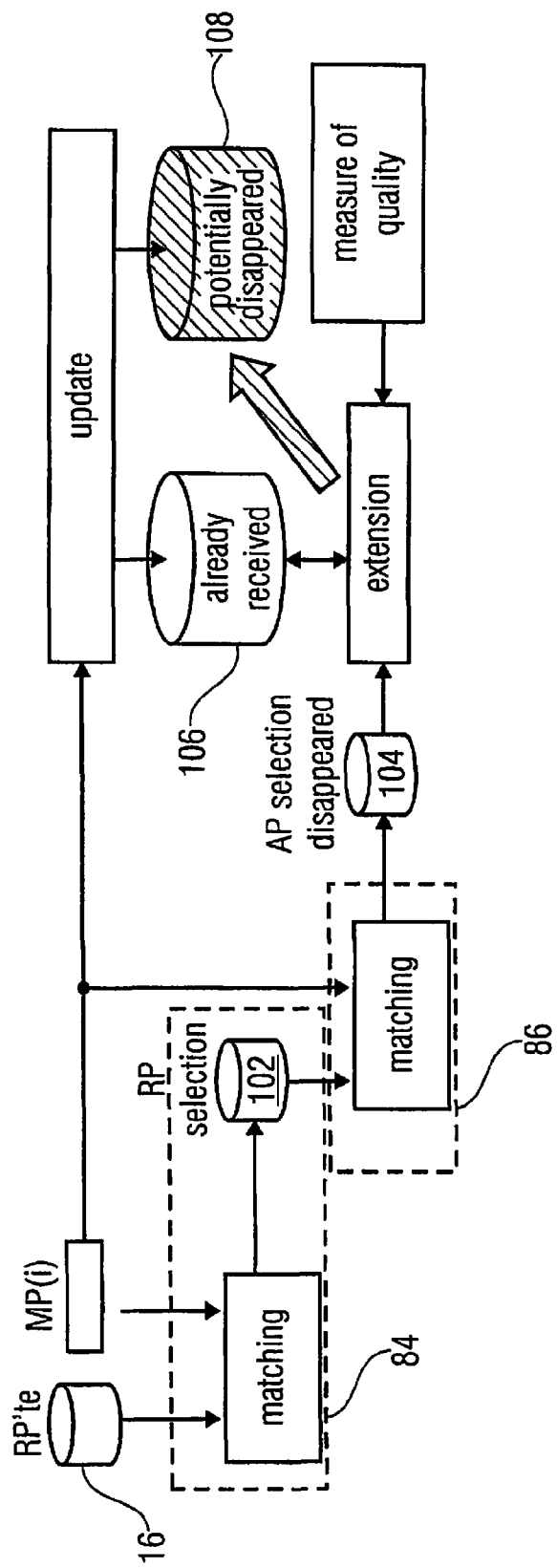
FIG. 9 shows a block diagram of an apparatus for generating corresponding experience messages in accordance with an embodiment of the present invention.
Figure 10:
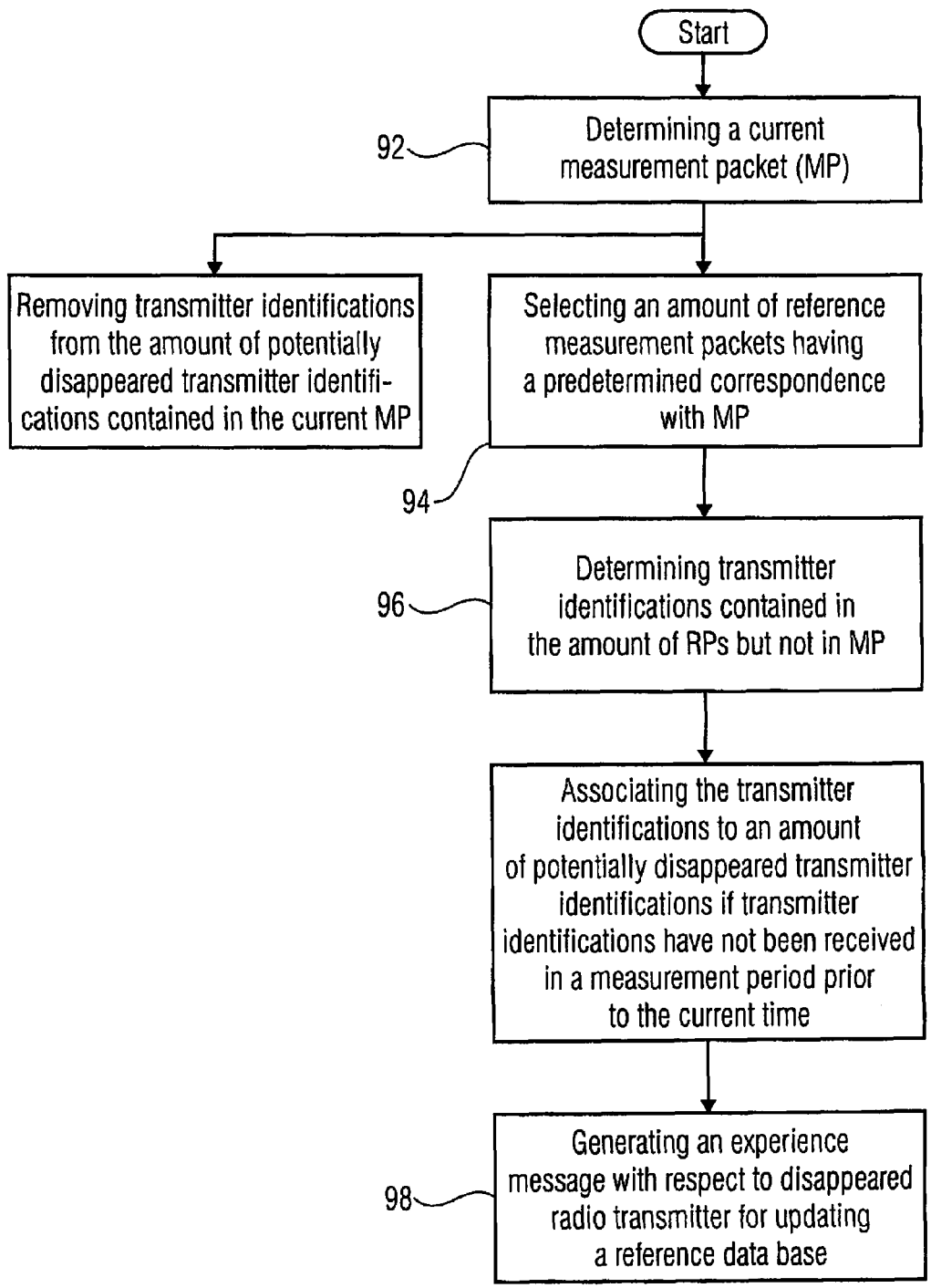
FIG. 10 shows a flow chart of a method for generating corresponding experience messages in accordance with another embodiment of the present invention.

According to an embodiment, the procedure discussed based on FIG. 9 runs locally on a mobile terminal device 10. This means the mobile terminal device 10 uses the already set-up information with respect to the potentially disappeared radio transmitters, as described in FIG. 11, in order to improve the running localization. At certain time intervals or at a favorable option with respect to setting up a connection to the central server or a further mobile terminal device, experience messages are generated from the potentially disappeared radio transmitters and the associated additional information and transmitted. This has, for example, the advantage that updating the reference database 16 takes place based on experience messages of different mobile terminal devices and hence this update can be more reliable than when it is based merely on the experience of only one mobile terminal device.

Therefore, the mobile terminal device 10 has an interface for transmitting an experience message to a spatially remote central reference database server or further mobile terminal devices.

In an embodiment, experience messages can be generated for each potentially disappeared station. Alternatively, experience messages can be generated at fixed time points such as per day, per a certain number of localization events or depending on certain events such as a corresponding command from a user or before the localization device is switched off.

Furthermore, it is useful, to set the data stored in 106 to zero, when an experience message has been generated. Furthermore, there can be used a certain initialization time instant or event at which both storage portions 106 and 108 are zet to zero, i.e. all stored identifications are deleted. Then, a certain time for filling up both storage portions would occur without actually generating experience messages. The generation and transmission of an experience message could occur after a certain time period calculated from the time of initialization and/or when a certain amount of identifications are stored in storage 106 and/or storage 108. Then, the experience message could include all identifications/elements stored in storage 108. After an experience message is sent out, the storage 106 is set back as well.

Figure 11:
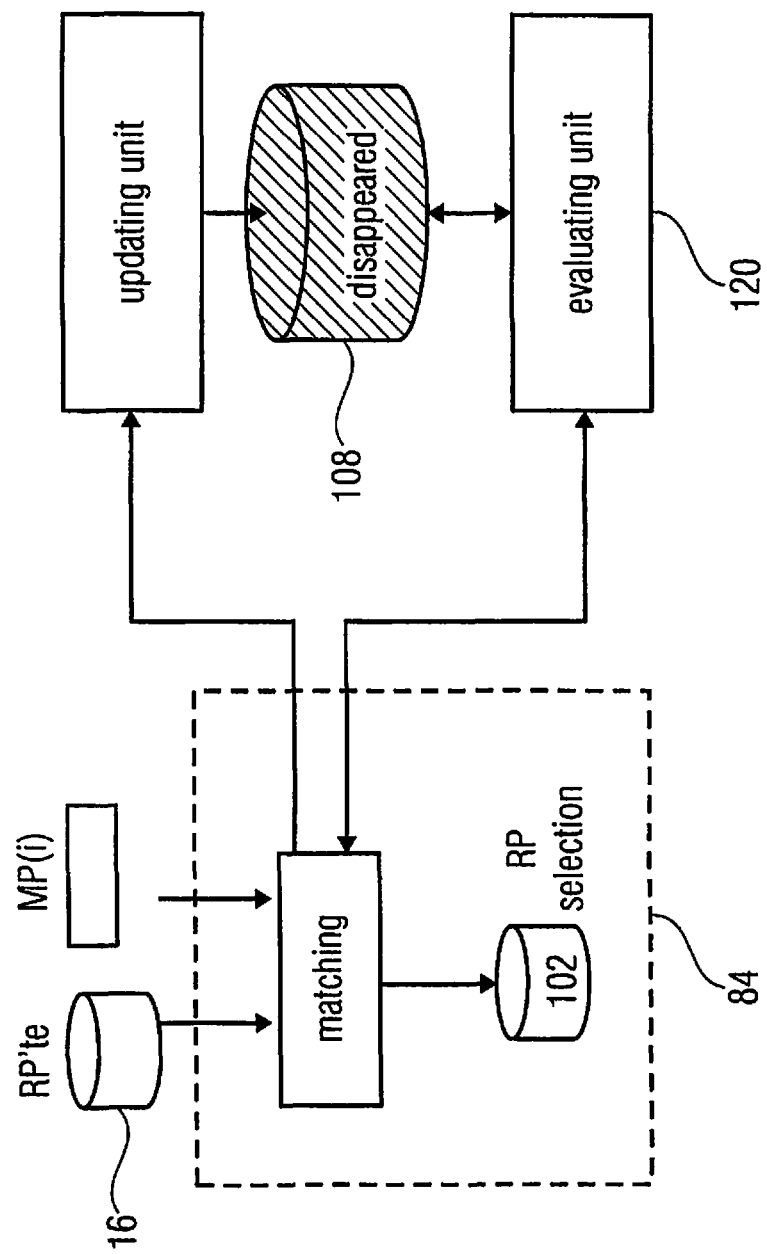
FIG. 11 shows a schematic illustration of feedback of information with regard to potentially disappeared radio transmitters in current localization in accordance with an embodiment of the present invention.
Figure 12:
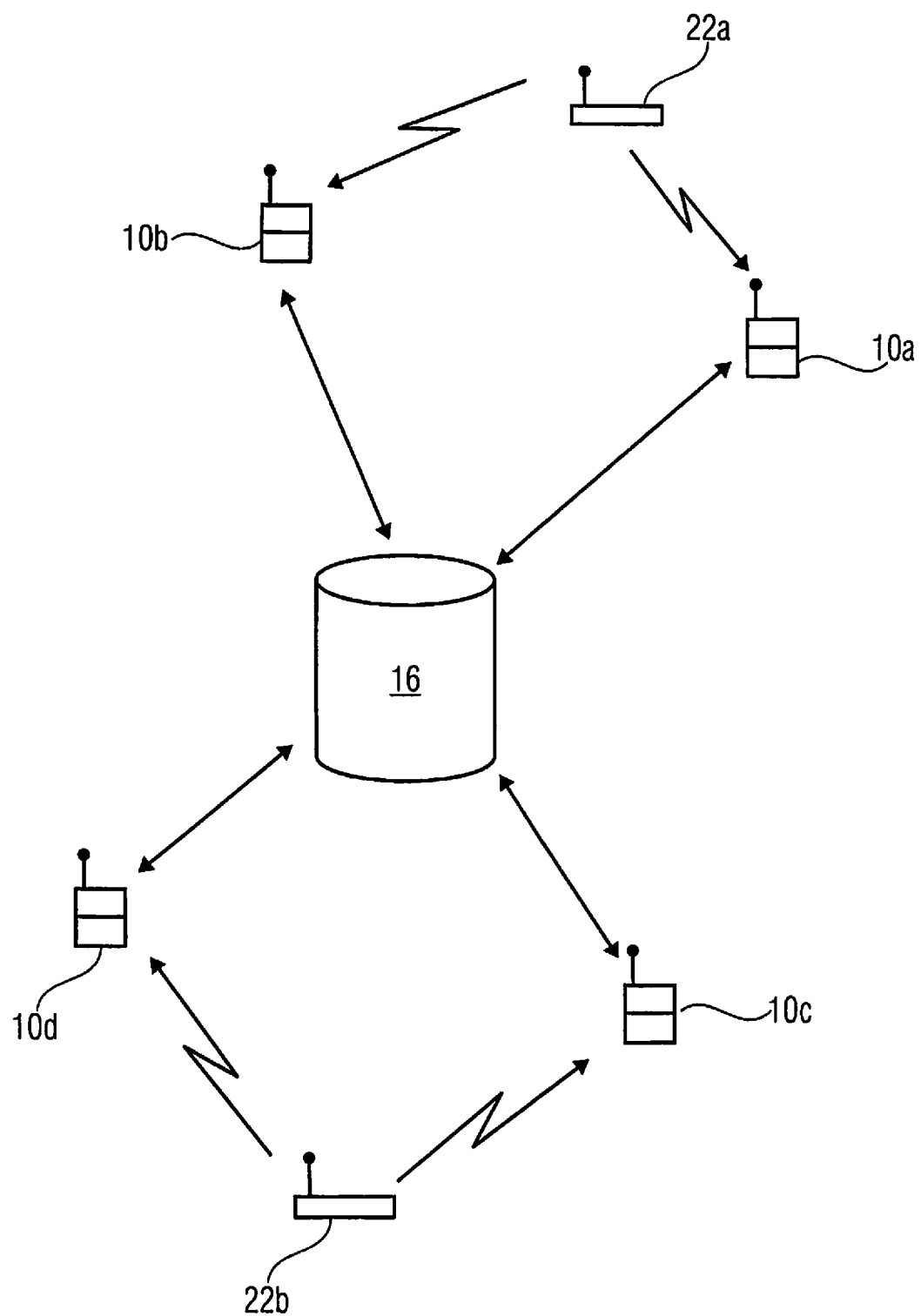
FIG. 12 shows a schematic illustration of a central reference database containing updating information (experience messages) from a plurality of mobile terminal devices.

According to an embodiment of the present invention, the amount 108 of potentially disappeared radio transmitters can be used for the matching phase, i.e. the determination of the measure of correspondence or the distance acc between current measurement packet MP(i) and reference measurement packets as schematically shown in FIG. 11.

An evaluation unit 120 evaluates the already determined experience messages with respect to the amount 108 of potentially disappeared radio transmitters depending on the contained additional information, such as allowability of position determination (measure of quality) or the frequency with which the experience message has been generated. In positioning by means of fingerprinting (unit 84), for every reference measurement packet to be compared, those radio transmitters not contained in the current measurement packet are determined. These radio transmitters with respect to a reference measurement packet are either an indication that the position of the reference measurement packet does not match the current position or that this radio transmitter has disappeared. In order to exclude the latter case, the respective radio transmitters are checked by the evaluating means 120, whether they are to be classified as disappeared. If this is the case these radio transmitters can be disregarded in the matching phase between current measurement packet MP(i) and reference measurement packets. This means the means 84 is coupled to the evaluating unit 120 in order to estimate the current geographical position based on matching the current measurement packet MP(i) with reference measurement packets RP from the database 16 and based on a feedback of experience messages with respect to the amount 108 of transmitter identifications to be potentially removed into the comparison. The current geographical position is estimated based on a measure of correspondence acc between the current measurement packet MP(i) and a reference measurement packet depending on a number of corresponding transmitter identifications between the current measurement packet MP(i) and the reference packet and differences between quantities in relation with a received field strength (RSSI values) associated with the matching transmitter identifications, such that radio transmitters that are not received at the current geographical position but that are listed in the amount 108 of transmitter identifications to be potentially removed have no influence on the measure of correspondence acc. This means, for example, that radio transmitters not received at the current position that are listed in the amount 108 of potentially disappeared radio transmitters are not provided with the penalty functions that decrease the matching. If, however, radio transmitters not received at the current position are not listed in the amount 108 of potentially disappeared radio transmitters, this might be only a short-term shading of the respective radio transmitters, such that the same can be provided with penalty functions for the matching.

In a further embodiment, the actual localization is improved by the amount of potentially disappeared transmitters in storage 108. Normally, a transmitter in the reference packet, which is not present in the measure packet would create a penalty in the localization. In the embodiment, however, the localization is performed so that a transmitter located in storage/amount 108 is considered in the localization so that this transmitter does not result in a penalty. This direct feedback in the localization device can be performed without having created an experience message to an external device.

As has already been mentioned above, updating the database 16 could be performed locally on every mobile terminal device itself, such that every mobile terminal device has practically its own horizon of experience, depending on where the same is located or has been located. According to other embodiments, the update of the reference database 16 can also be centralized, e.g. when the reference database 16 is stored on a central server connected to the different mobile terminal devices. This situation is shown schematically in FIG. 12.

The experience messages of the individual mobile terminal devices 10a to 10d are transmitted appropriately (e.g. in a raw or preprocessed form) to the central server having the reference database 16. After rendering and matching with other respective experience messages of other mobile terminal devices by an evaluating unit on the server (not shown), possibly, respective reference measurement packets at respective reference points are reduced or extended by certain radio transmitters.

It is the goal of an inventive reference data update to extend reference packets by new radio transmitters, possibly together with the respective RSSI value, the PGS value or further data, or to reduce them by disappeared radio transmitters and their entries. Therefore, it is useful to select matching reference packets from position data of the localization to which this experience message is to be applied. How much the WLAN positioning for the respective experience message can be trusted can be decided in dependence on the respective quality value. A further challenge is that possibly several experience messages from different mobile terminal devices for the same location can be processed. Here, it is important that in addition to the quality of the position, a quality of the determining terminal device is also considered. Further, it has to be considered that radio signals are measured at different levels by different mobile terminal devices. Deviations can be several dB. Thus, it can be important to characterize device types in advance in order to be able to react accordingly to an experience message based on a contained device-ID.

Figure 13:
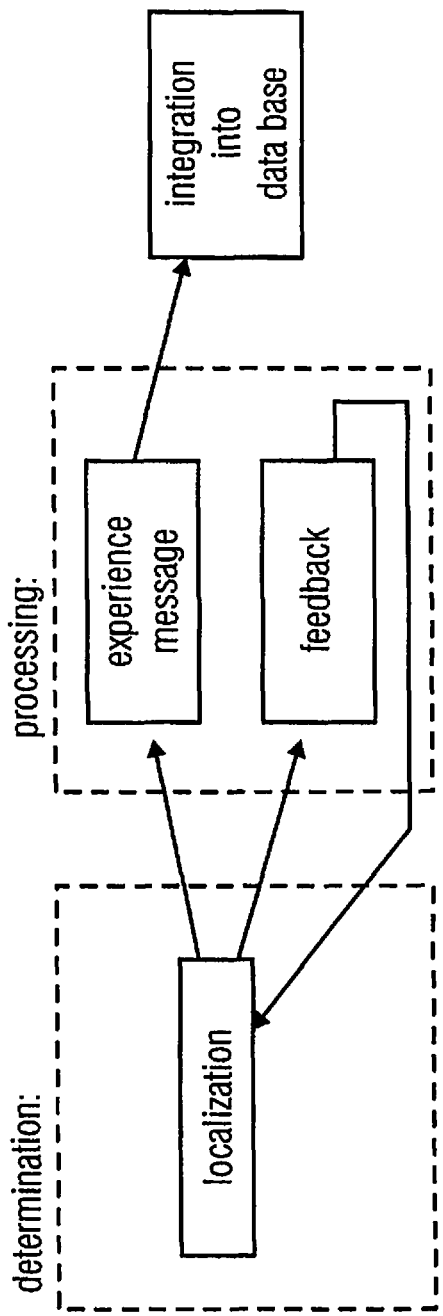
FIG. 13 shows a schematic illustration of determining, processing and integrating experience messages in the reference database.

In summary, embodiments of the present invention can be used for obtaining or increasing a navigation or localization quality by constantly updating a reference database with reference packets without dedicated calibration of reference points at regular intervals. In the concept presented here, experience messages about changes of the infrastructure are generated by mobile terminal devices participating in the system. The same can be fed back into a running localization on the mobile terminal device in order to improve them in a relatively timely manner or they can also be transmitted to a server for performing an update of the reference database 16 as schematically shown in FIG. 13.

Depending on the circumstances, the inventive concept for updating can be implemented in hardware or in software. The implementation can be performed on a digital memory medium, in particular a disk, CD or DVD having electronically readable control signals, that can cooperate with a programmable computer system such that the inventive method for updating the reference database is performed. Generally, the invention consist also of a computer program product having a program code stored on a machine readable carrier for performing the inventive method when the computer program product runs on a computer and/or microcontroller. In other words, the invention can be realized as a computer program having a program code for performing the method when the computer program runs on a computer or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for updating a reference database comprising reference measurement packets associated with geographical reference positions, which comprise reference transmitter identifications of radio transmitters receivable at the reference position at the reference times, determined at the respective geographical reference positions at reference times, comprising:
   a determiner for determining a current measurement packet at a current geographical position at a current time, wherein the current measurement packet comprises transmitter identifications of radio transmitters receivable at the current geographical position at the current time;
   a selector for selecting an amount of reference measurement packets exceeding a predetermined measure of correspondence to the current measurement packet, wherein the amount of selected reference measurement packets comprises a reference measurement packet or a plurality of reference measurement packets;
   a storer for storing that is implemented to store transmitter identifications received prior to the current time and after a last update of the reference database in an amount of previously received radio transmitters;
   a determiner for determining a transmitter identification comprised in the amount of selected reference measurement packets and not comprised in the current measurement packet; and
   a generator for generating an experience message with respect to the determined transmitter identification, wherein the generator for generating the experience message is adapted to store the determined transmitter identification in an amount of transmitter identifications to be potentially removed, when the determined transmitter identification is not stored in the amount of previously received radio transmitters stored by the storer.

2. The apparatus according to claim 1, wherein the selector is implemented to estimate the current geographical position by a comparison of the current measurement packet with reference measurement packets, and to determine a measure of correspondence between the current measurement packet and a reference measurement packet with a reference position close to the estimated current geographical position depending on a number of corresponding transmitter identifications between the current measurement packet and the reference packet and differences between quantities in relation with a received field strength that are associated with the corresponding transmitter identifications.

3. The apparatus according to claim 2, wherein the measure of correspondence is the higher the more transmitter identifications correspond and the smaller the differences are.

4. The apparatus according to claim 1, wherein the generator for generating the experience message is adapted to remove a transmitter identification already associated with the amount of transmitter identifications to be potentially removed again from this amount if the same is comprised in the current measurement packet and hence belongs to the amount of previously received radio transmitters.

5. The apparatus according to claim 1 comprising an updating unit for updating a database, and wherein the generator for generating the experience message is implemented to generate experience messages for radio transmitters of the amount of transmitter identifications to be potentially removed and to transmit them to the updating unit when a measure of probability is exceeded that indicates how high a probability is to be estimated that a radio transmitter in the amount of transmitter identifications to be removed is actually no longer present in an environment of the current geographical position.

6. The apparatus according to claim 1, wherein the selector is implemented to estimate the current geographical position based on a comparison of the current measurement packet MP(i) with reference measurement packets and based on a feedback of experience messages with respect to the amount of center transmitter identifications to be potentially removed into the comparison.

7. The apparatus according to claim 6, wherein the current geographical position is estimated based on a measure of correspondence between the current measurement packet MP(i) and a reference measurement packet depending on a number of corresponding transmitter identifications between the current measurement packet MP(i) and the reference packet and differences between quantities in relation with a received field strength associated with the corresponding transmitter identifications, such that radio transmitters not received at the current geographical position that are listed in the amount of transmitter identifications to be potentially removed exert no influence in the form of a penalty on the measure of correspondence.

8. The apparatus according to claim 1 implemented in a mobile terminal device.

9. The apparatus according to claim 8 wherein the mobile terminal device is a WLAN-capable mobile terminal device.

10. The apparatus according to claim 1, wherein the radio transmitters receivable by the apparatus are WLAN base stations comprising MAC addresses as transmitter identifications.

11. A method for updating a reference database comprising reference measurement packets associated with geographical reference positions, which comprise reference transmitter identifications of radio transmitters receivable at the reference position at the reference times, determined at the respective geographical reference positions at reference times, comprising:
   determining a current measurement packet at a current geographical position at a current time, wherein the current measurement packet comprises transmitter identifications of radio transmitters receivable at the current geographical position at the current time;

selecting an amount of reference measurement packets exceeding a predetermined measure of correspondence to the current measurement packet, wherein the amount of selected reference measurement packets comprises a reference measurement packet or a plurality of reference measurement packets;

storing transmitter identifications received prior to the current time and after a last update of the reference database in an amount of previously received radio transmitters;

determining a transmitter identification comprised in the amount of the selected reference measurement packets and not comprised in the current measurement packet; and generating an experience message with respect to the determined transmitter identification, wherein the determined transmitter identification is stored in an amount of transmitter identifications to be potentially removed, when the determined transmitter identification is not stored in the amount of previously received radio transmitters.

12. A computer program stored in a computer readable medium for performing the method for updating a reference database comprising reference measurement packets associated with geographical reference positions, which comprise reference transmitter identifications of radio transmitters receivable at the reference position at the reference times, determined at the respective geographical reference positions at reference times, the method comprising:

determining a current measurement packet at a current geographical position at a current time, wherein the current measurement packet comprises transmitter identifications of radio transmitters receivable at the current geographical position at the current time;

selecting an amount of reference measurement packets exceeding a predetermined measure of correspondence to the current measurement packet, wherein the amount of selected reference measurement packets comprises a reference measurement packet or a plurality of reference measurement packets;

storing transmitter identifications received prior to the current time and after a last update of the reference database in an amount of previously received radio transmitters;

determining a transmitter identification comprised in the amount of the selected reference measurement packets and not comprised in the current measurement packet; and generating an experience message with respect to the determined transmitter identification, wherein the determined transmitter identification is stored in an amount of transmitter identifications to be potentially removed, when the determined transmitter identification is not stored in the amount of previously received radio transmitters, when the computer program runs on a computer or microcontroller.

* * * * *